(12) United States Patent
Tominaga et al.

(10) Patent No.: US 12,620,048 B2
(45) Date of Patent: May 5, 2026

(54) INFORMATION PROCESSING SYSTEM, INFORMATION PROCESSING METHOD, AND NON-TRANSITORY STORAGE MEDIUM

(71) Applicant: NEC Corporation, Tokyo (JP)

(72) Inventors: Shin Tominaga, Tokyo (JP); Yusuke Imai, Tokyo (JP); Kazutoshi Sagi, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 18/226,732

(22) Filed: Jul. 26, 2023

(65) Prior Publication Data

US 2024/0104680 A1       Mar. 28, 2024

(30) Foreign Application Priority Data

Sep. 28, 2022    (JP) ................................. 2022-154537

(51) Int. Cl.
| | |
|---|---|
| *G06T 1/00* | (2006.01) |
| *G06T 7/00* | (2017.01) |
| *G06T 7/80* | (2017.01) |

(52) U.S. Cl.
CPC .......... *G06T 1/0007* (2013.01); *G06T 7/0002* (2013.01); *G06T 7/80* (2017.01); *G06T 2207/20081* (2013.01); *G06T 2207/30192*

(2013.01); *G06T 2207/30232* (2013.01); *G06T 2207/30236* (2013.01); *G06T 2207/30252* (2013.01)

(58) Field of Classification Search
None
See application file for complete search history.

(56) References Cited

U.S. PATENT DOCUMENTS 11,144,786 B2 *  10/2021  Tomioka et al. ........ G06K 9/62

FOREIGN PATENT DOCUMENTS

| | | |
|---|---|---|
| WO | 2018/047393 A1 | 3/2018 |
| WO | 2019/187291 A1 | 10/2019 |

* cited by examiner

*Primary Examiner* — Twyler L Haskins
(74) *Attorney, Agent, or Firm* — Sughrue Mion, PLLC

(57) ABSTRACT

To improve accuracy of a result acquired by analyzing, by using a machine learning model, an image in which a road is captured, an information processing system 100 is an information processing system for collecting a machine learning image, and includes a generation unit 122 and a storage processing unit 123. The generation unit 122 processes an image in which a road is captured, and generates capturing situation information indicating a situation related to capturing of the image. The storage processing unit 123 performs processing for storing an image, based on the capturing situation information.

19 Claims, 28 Drawing Sheets

FIG. 5

| IMAGE INFORMATION | | | | |
|---|---|---|---|---|
| | IMAGE ACCOMPANYING INFORMATION | | | |
| IMAGE | IMAGE IDENTIFICATION INFORMATION (IMAGE ID) | CAPTURING APPARATUS IDENTIFICATION INFORMATION (CAPTURING ID) | CAPTURING TIMING | CAPTURING PLACE |

FIG. 7

| EXAMPLE OF CAPTURING SITUATION INFORMATION | | EXAMPLE OF CAPTURING SITUATION INFORMATION USED IN EXAMPLE EMBODIMENT 1 |
|---|---|---|
| (1) CAPTURING TIMING | (1-1) TIME,<br>(1-2) TIME CLASSIFICATION,<br>(1-3) WEEK CLASSIFICATION,<br>(1-4) MONTH CLASSIFICATION,<br>(1-5) YEAR CLASSIFICATION, etc. | TIME CLASSIFICATION OF MORNING, DAYTIME, EVENING, AND NIGHT |
| (2) CAPTURING CONDITION | (2-1) IRRADIATION STATE,<br>(2-2) WEATHER,<br>(2-3) EXPOSURE INFORMATION,<br>(2-4) BRIGHTNESS INFORMATION ABOUT IMAGE, etc. | IRRADIATION STATE AND WEATHER.<br>IRRADIATION STATE IS ANY OF BACKLIGHT, FRONT LIGHT, AND OBLIQUE LIGHT.<br>WEATHER IS ONE OR A PLURALITY OF SUNNY, CLOUDY, RAINY, SNOWY, AND STRONG WIND. |
| (3) APPARATUS INFORMATION | (3-1) CAPTURING RANGE,<br>(3-2) CAPTURING ID,<br>(3-3) DEPRESSION ANGLE IN CAPTURING DIRECTION AND LIKE, etc. | CAPTURING ID AND DEPRESSION ANGLE IN CAPTURING DIRECTION |
| (4) ROAD INFORMATION | (4-1) ROAD STATE,<br>(4-2) EVENT THAT OCCURS ON ROAD,<br>(4-3) ROAD UNIQUE INFORMATION, etc. | ROAD STATE, EVENT, AND ROAD UNIQUE INFORMATION. ROAD UNIQUE INFORMATION IS TRAVELING DIRECTION ON ROAD |

Figure 11:
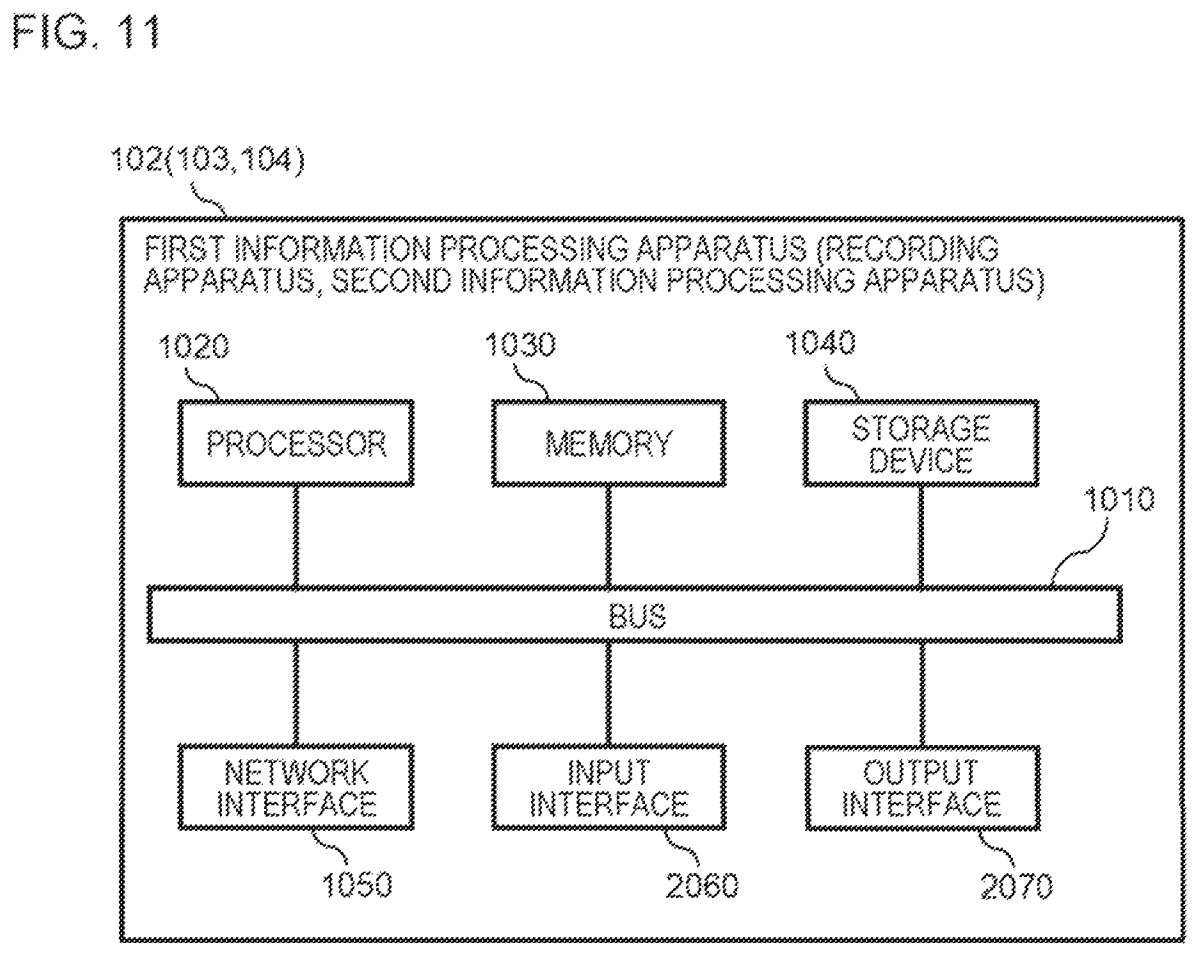

FIRST INFORMATION PROCESSING APPARATUS (RECORDING APPARATUS, SECOND INFORMATION PROCESSING APPARATUS)

1020 PROCESSOR

1030 MEMORY

1040 STORAGE DEVICE

1010

BUS

1050 NETWORK INTERFACE

2060 INPUT INTERFACE

2070 OUTPUT INTERFACE

FIG. 28

INFORMATION PROCESSING SYSTEM, INFORMATION PROCESSING METHOD, AND NON-TRANSITORY STORAGE MEDIUM

RELATED ART

The present invention relates to an information processing system, an information processing method, and a non-transitory storage medium.

Various apparatuses that analyze an image in which a road is captured are proposed.

For example, an information processing apparatus described in PTL 1 (International Publication No. WO2019/187291) acquires video data from a camera that continuously captures a traffic state of a predetermined road, and generates statistical information about traffic on the road from the video data.

Further, for example, PTL 2 (International Publication No. WO2018/047393) discloses a video output system installed in a vehicle. The video output system includes an interface apparatus and a camera.

The interface apparatus described in PTL 2 includes a condition storage unit, and a video output unit that outputs a video received from the camera. When a recording condition is input from a vehicle-mounted apparatus, the condition storage unit determines a recording condition ID associated to the recording condition from a recording condition table, and outputs the recording condition ID to the camera.

The camera described in PTL 2 functions as a video generation unit that captures surroundings of a vehicle and generates a captured video, a recognition unit, a comparison unit, and a camera calculation unit that outputs the generated captured video to the interface apparatus.

The recognition unit performs recognition processing on, as a recognition target, a target object such as a pedestrian, a vehicle, a two-wheeled vehicle, a sign, and a road division line, and an environment such as a daytime, a nighttime, and a backlight state. When the target object or the environment being the recognition target is recognized in a frame being a processing target, the recognition unit outputs identification information and additional information. The comparison unit decides whether a frame of a captured image in which the recognition unit recognizes a specific target object or a specific environment satisfies a recording condition.

When the recognition unit outputs the identification information and the additional information, and the comparison unit decides that the recording condition is satisfied, the camera calculation unit adds the identification information and the additional information to a captured video, and outputs the added captured video to the interface apparatus. When the recognition unit does not output the identification information and the additional information, or when the comparison unit decides that the recording condition is not satisfied, the camera calculation unit does not add the identification information and the additional information, and outputs only a captured video to the interface apparatus.

SUMMARY

PTL 1 does not disclose a technique for improving accuracy of statistical information about traffic on a road. PTL 2 does not disclose a technique for improving accuracy of recognition of a recognition target in recognition processing.

One example of an object of the present invention is, in view of the problem described above, to provide an information processing system, an information processing method, a non-transitory storage medium storing a program and the like that solve a challenge to improve accuracy of a result acquired by analyzing, by using a machine learning model, an image in which a road is captured.

One aspect of the present invention provides an information processing system for collecting a machine learning image, the information processing system including:

a generation means for processing an image in which a road is captured, and generating capturing situation information indicating a situation related to capturing of the image; and a storage processing means for performing processing for storing the image, based on the capturing situation information.

One aspect of the present invention provides an information processing apparatus for collecting a machine learning image, the information processing apparatus including:

a generation means for processing an image in which a road is captured, and generating capturing situation information about a situation related to capturing of the image; and a storage processing means for performing processing for storing the image, based on the capturing situation information.

One aspect of the present invention provides an information processing method for collecting a machine learning image by one or more computers, the information processing method including, by the one or more computers:

processing an image in which a road is captured, and generating capturing situation information about a situation related to capturing of the image; and performing processing for storing the image, based on the capturing situation information.

One aspect of the present invention provides a program for causing one or more computers to collect a machine learning image, the program for causing the one or more computers to execute:

processing an image in which a road is captured, and generating capturing situation information about a situation related to capturing of the image; and performing processing for storing the image, based on the capturing situation information.

One aspect of the present invention is able to improve accuracy of a result acquired by analyzing, by using a machine learning model, an image in which a road is captured.

BRIEF DESCRIPTION OF THE DRAWINGS

FIG. 5 is a diagram illustrating a configuration example of image information according to the example embodiment 1.

FIG. 7 is a diagram illustrating an example of capturing situation information.

FIG. 10 is a diagram illustrating a physical configuration example of a capturing apparatus according to the example embodiment 1.

FIG. 11 is a diagram illustrating a physical configuration example of the first information processing apparatus according to the example embodiment 1.

FIG. 28 is a diagram illustrating a configuration example of an information processing system according to a modification example 3.

DETAILED DESCRIPTION

Hereinafter, an example embodiment 1 of the present invention will be described by using drawings. Note that, in all of the drawings, a similar component has a similar reference sign, and description thereof will be appropriately omitted.

Example Embodiment 1

(Overview)

Figure 1:
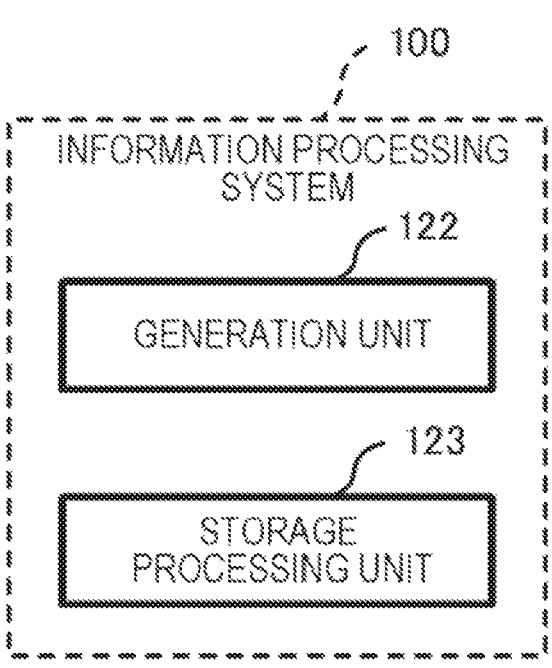
FIG. 1 is a diagram illustrating an overview of an information processing system according to an example embodiment 1.

FIG. 1 is a diagram illustrating an overview of an information processing system 100 according to the example embodiment 1.

The information processing system 100 is an information processing system for collecting a machine learning image, and includes a generation unit 122 and a storage processing unit 123. The generation unit 122 processes an image in which a road is captured, and generates capturing situation information indicating a situation related to capturing of the image. The storage processing unit 123 performs processing for storing the image, based on the capturing situation information.

The information processing system 100 can improve accuracy of a result acquired by analyzing, by using a machine learning model, an image in which a road is captured.

Figure 2:
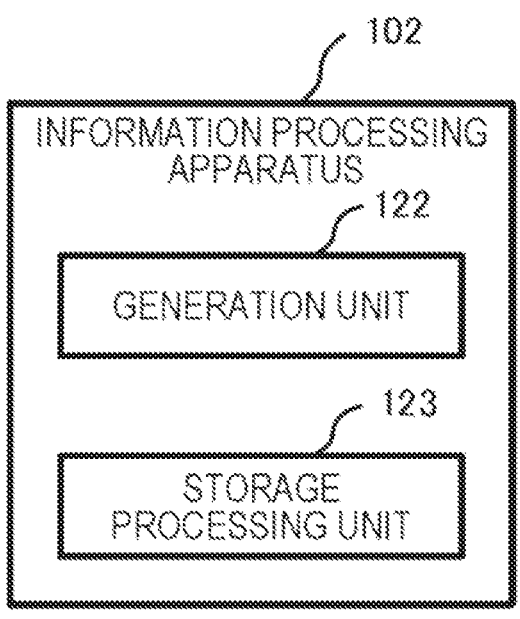
FIG. 2 is a diagram illustrating an overview of an information processing apparatus according to the example embodiment 1.

FIG. 2 is a diagram illustrating an overview of an information processing apparatus 102 according to the example embodiment 1.

The information processing apparatus 102 is an information processing apparatus for collecting a machine learning image, and includes the generation unit 122 and the storage processing unit 123. The generation unit 122 processes an image in which a road is captured, and generates capturing situation information indicating a situation related to capturing of the image. The storage processing unit 123 performs processing for storing the image, based on the capturing situation information.

The information processing apparatus 102 can improve accuracy of a result acquired by analyzing, by using a machine learning model, an image in which a road is captured.

Figure 3:
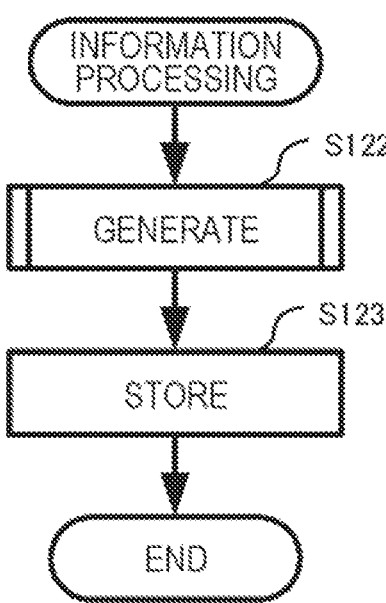
FIG. 3 is a flowchart illustrating an overview of information processing according to the example embodiment 1.

FIG. 3 is a flowchart illustrating an overview of information processing according to the example embodiment 1.

The generation unit 122 processes an image in which a road is captured, and generates capturing situation information indicating a situation related to capturing of the image (step S122). The storage processing unit 123 performs processing for storing the image, based on the capturing situation information (step S123).

The information processing can improve accuracy of a result acquired by analyzing, by using a machine learning model, an image in which a road is captured.

A detailed example of the information processing system 100 according to the example embodiment 1 will be described below.

(Detail)

Figure 4:
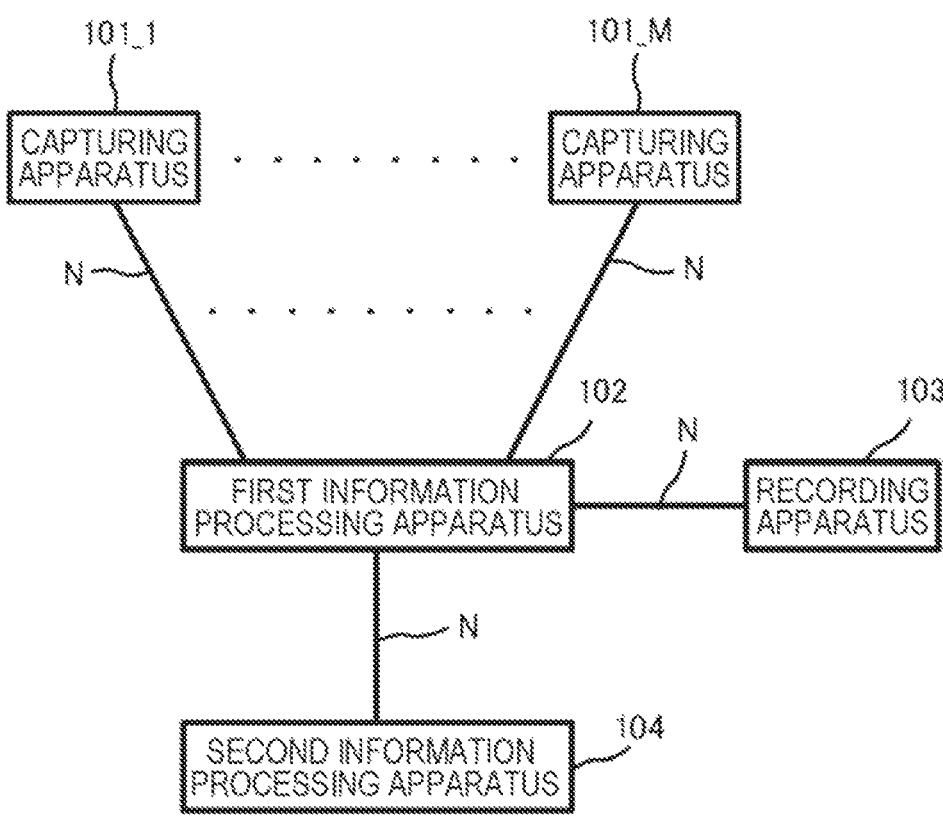
FIG. 4 is a diagram illustrating a configuration example of the information processing system according to the example embodiment 1.

FIG. 4 is a diagram illustrating a configuration example of the information processing system 100 according to the example embodiment 1. The information processing system 100 is a system for collecting a machine learning image. In the present example embodiment, description will be given by using an example in which a function for collecting a machine learning image is incorporated into a system for surveying a road.

As illustrated in FIG. 4, the information processing system 100 includes capturing apparatuses 101_1 to 101_M, a first information processing apparatus 102, a recording apparatus 103, and a second information processing apparatus 104. Herein, M is an integer equal to or more than one.

Each of the capturing apparatuses 101_1 to 101_M, the first information processing apparatus 102, the recording apparatus 103, and the second information processing apparatus 104 are connected to one another via a network N constituted in, for example, a wired manner, a wireless manner, or in combination of the manners, and can transmit and receive information to one another via the network N.
(Functional Configuration Example of Capturing Apparatuses 101_1 to 101_M)

The capturing apparatuses 101_1 to 101_M capture a predetermined capturing range on a road. The capturing apparatuses 101_1 to 101_M vary in range (capturing range) being captured by each of the capturing apparatuses 101_1 to 101_M. Note that, a part of a plurality of capturing ranges generated by each of the capturing apparatuses 101_1 to 101_M may include the same range as another capturing range.

Functions of the capturing apparatuses 101_1 to 101_M may be similar to each other. Thus, when the capturing apparatuses 101_1 to 101_M are not distinguished, the capturing apparatuses 101_1 to 101_M are also expressed as a "capturing apparatus 101" below.

When the capturing apparatus 101 captures a capturing range, the capturing apparatus 101 generates an image in which the capturing range is captured. Then, the capturing apparatus 101 generates image information including the generated image, and transmits the image information to the first information processing apparatus 102.

For example, the capturing apparatus 101 performs capturing with a predetermined frequency (frame rate). An image in this case is, for example, a frame image captured at the predetermined frame rate. Note that, an image may be either a color image or a monochrome image, and a pixel number of the image may be appropriately selected.

FIG. 5 is a diagram illustrating a configuration example of image information according to the example embodiment 1. The image information is information in which image accompanying information is associated with an image generated by the capturing apparatus 101. The image accompanying information is, for example, image identification information, capturing apparatus identification information, a capturing time, a capturing place, and the like. The image identification information is information for identifying the image information. Hereinafter, the image identification information is also referred to as an "image identification information (ID)".

The capturing apparatus identification information is information for identifying the capturing apparatus 101. Hereinafter, the capturing apparatus identification information is also referred to as a "capturing ID".

The capturing time is information indicating a time at which capturing is performed. The capturing time is formed of, for example, year, month, and day, and a time. The time may be represented by a predetermined interval such as a $1/10$ second and a $1/100$ second.

The capturing place is information indicating a place at which capturing is performed. For example, the capturing place is information indicating a place where the capturing apparatus 101 is installed, and is formed of a latitude and a longitude indicating the place. For example, when the capturing apparatus 101 has a position detection function, the capturing place may be acquired by using the position detection function, or may be preset by a person who installs the capturing apparatus 101, and the like. The position detection function is a function of detecting a position of the capturing apparatus 101 by using a global positioning system (GPS) and the like.

Note that, the capturing place is not limited to an installation place of the capturing apparatus 101, and may be, for example, information indicating a capturing range of the capturing apparatus 101, and, in this case, may be formed of, for example, a latitude and a longitude indicating the capturing range. Further, the image information may include an image in which a road is captured, and may not include the image accompanying information. Furthermore, when the image accompanying information is included, the image accompanying information is not limited to the example described above, and may include at least one of the image identification information, the capturing apparatus identification information, the capturing time, the capturing place, and the like.
(Functional Configuration Example of First Information Processing Apparatus 102)

Figure 6:
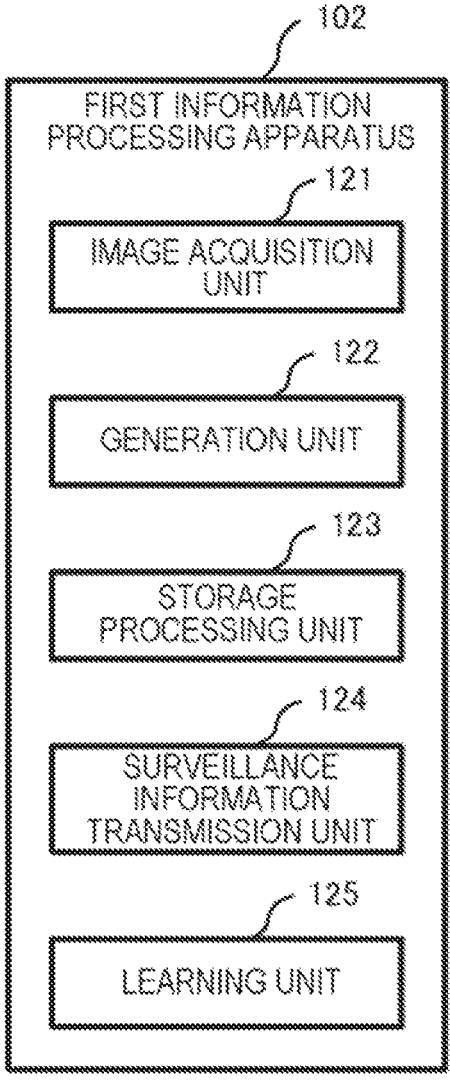
FIG. 6 is a diagram illustrating a functional configuration example of a first information processing apparatus according to the example embodiment 1.

FIG. 6 is a diagram illustrating a functional configuration example of the first information processing apparatus 102 according to the example embodiment 1. The first information processing apparatus 102 is an apparatus for generating capturing situation information by processing an image in which a road is captured, and storing the generated capturing situation information.

The first information processing apparatus 102 corresponds to the "information processing apparatus 102" described above.

As illustrated in FIG. 6, the first information processing apparatus 102 includes an image acquisition unit 121, the generation unit 122, the storage processing unit 123, a surveillance information transmission unit 124, and a learning unit 125.

The image acquisition unit 121 acquires image information including an image from the capturing apparatus 101.

Note that, in a case of a plurality of the capturing apparatuses 101, the image acquisition unit 121 may acquire image information from each of the plurality of capturing apparatuses 101. Further, for processing on a plurality of images, similar processing may be performed on each of the images.

The generation unit 122 processes an image in which a road is captured, and generates capturing situation information. In the present example embodiment, the generation unit 122 processes an image in which a road is captured, and generates capturing situation information by using the processing result.
(Capturing Situation Information)

FIG. 7 is a diagram illustrating an example of capturing situation information. The example of the capturing situation information will be described below, but the capturing situation information is not limited to the example described herein.

The capturing situation information is information indicating a situation (capturing situation) related to capturing of an image being a processing target. The capturing situation information may include, for example, at least one of (1) a capturing timing, (2) a capturing condition, (3) apparatus information, (4) road information, and the like.

(1) The capturing timing is information indicating a timing at which capturing is performed.

For example, the capturing timing may be at least one of (1-1) a time, (1-2) a time classification, (1-3) a week classification, (1-4) a month classification, (1-5) a year classification, and the like.

The time classification is a classification associated with a predetermined time period. For example, the time classification may be morning, daytime, evening, night, and the like. The week classification is a classification associated with a day constituting a week. For example, the week classification may be a day of a week, a weekday, a weekend (for example, Saturday, Sunday, and a holiday), and the like. The month classification is a classification associated with a period constituting a month. For example, the month classification may be an early part of a month, a middle part of the month, and a last part of the month acquired by associating the month with a period of substantially 10 days. The year classification is a classification associated with a period constituting a year. For example, the year classification may be four seasons acquired by associating a year with a period of three months.

(2) The capturing condition is information indicating a condition related to capturing.

For example, the capturing condition is information indicating a condition related to light in a capturing range captured in an image. Specifically, for example, the capturing condition may be at least one of (2-1) an irradiation state, (2-2) weather, (2-3) exposure information, (2-4) brightness information about an image, and the like.

(2-1) The irradiation state is information indicating a state of light applied to a capturing range.

For example, the irradiation state may be at least one of a sunshine state, an artificial light state, and the like. The sunshine state is information indicating a state of sunlight applied to a capturing range. The artificial light state is information indicating a state of artificial light such as an electric lamp that applies light to a capturing range. Sunlight and artificial light may be distinguished by, for example, a difference in color of light.

Specifically, for example, each of the sunshine state and the artificial light state may be backlight, front light, oblique light, and the like. The sunshine state may be, for example, the morning sun, the evening sun, and the like.

(2-2) The weather is information indicating weather in a capturing range. For example, the weather may be sunny, cloudy, rainy, snowy, a strong wind, and the like. The strong wind indicates that a wind speed in a capturing range is equal to or more than a predetermined value.

(2-3) The exposure information is information indicating exposure in capturing. For example, the exposure information may be a combination of a shutter speed and an f number.

(2-4) The brightness information about an image is information about a value acquired by processing a pixel value in an image. For example, the brightness information about an image may be a value acquired by performing statistical processing on a pixel value, and examples of a value acquired by performing the statistical processing can include an average value of a pixel value, a value indicating a distribution of a pixel value, and the like.

(3) The apparatus information is information about the capturing apparatus 101 that captures an image.

For example, the apparatus information may be at least one of (3-1) a capturing range of the capturing apparatus 101, (3-2) a capturing ID of the capturing apparatus 101, (3-3) a depression angle of the capturing apparatus 101 in a capturing direction, and the like. For example, the capturing range of the capturing apparatus 101 may be represented by a latitude and a longitude indicating the capturing range.

(4) The road information is information about a road captured in an image.

The road information may be, for example, at least one of (4-1) a road state, (4-2) an event that occurs on a road, and (4-3) road unique information.

(4-1) The road state is information indicating a state of an object on a road. (4-1) The road state may be detected by, for example, processing an image.

An object on a road is, for example, one or a plurality of a vehicle, a fallen object, and the like. A vehicle is, for example, one or a plurality of a passenger car, a truck, a trailer, a construction vehicle, an emergency vehicle, a motorcycle, a bicycle, and the like. A fallen object is an object fallen from a vehicle and the like to a road, an object that comes flying on a road by wind and the like, and the like.

The road state may include presence or absence of an object on a road. When an object is present on a road, the road state may include object identification information and an object state of each object. Note that, presence or absence of an object on a road may be represented by a flag indicating the presence or absence, the number of objects on the road, and the like, or may be represented by whether the object identification information is included in the road state.

The object identification information is information for identifying an object on a road. Hereinafter, the object identification information is also referred to as an "object ID". The object state is a state of each object.

A part or the whole of items included in the object state may be different for each kind of an object. For example, the object state (a vehicle state) of a vehicle is one or a plurality of a position of the vehicle, a traveling direction of the vehicle, a velocity of the vehicle, a flow line (movement track) of the vehicle, an attribute of the vehicle, and the like. The attribute of the vehicle is, for example, one or a plurality of a kind of the vehicle, a size of the vehicle, a color of the vehicle, a vehicle number described on a number plate, and the like. The kind of the vehicle is, for example, one or a plurality of a passenger car, a truck, a trailer, a construction vehicle, an emergency vehicle, a motorcycle, a bicycle, and the like described above.

For example, the object state (a fallen object state) of a fallen object is one or a plurality of a position of the fallen object, a movement direction, a movement velocity, a flow line, an attribute of the fallen object, and the like. The attribute of the fallen object is, for example, one or a plurality of a kind of the fallen object, a size of the fallen object, a color of the fallen object, and the like. The kind of the fallen object is, for example, one or a plurality of wood, a packed object, and the like.

(4-2) The event may be predetermined, and is, for example, one or a plurality of (A) a traffic jam of vehicles, (B) traveling of a vehicle in an opposite direction, (C) low velocity traveling of a vehicle, (D) stop of a vehicle, (E) a fallen object, and (F) zigzag traveling. (4-2) The event may be detected by, for example, processing an image.

(A) The traffic jam is detected on a condition that, for example, a train of vehicles formed of vehicle that perform low velocity traveling or vehicles that repeat stop and start has a length equal to or more than a predetermined distance and continues for a predetermined time length or more. The low velocity traveling herein is traveling at a predetermined velocity or less.

(B) The traveling of a vehicle in an opposite direction is detected by, for example, using conditions formed of (B-1) and (B-2) below. (B-1) is a condition that a traveling direction is predetermined for a road being a target or each lane constituting the road. (B-2) is a condition that a traveling direction of a vehicle and a traveling direction of a road or a lane on which the vehicle is traveling are different by over a predetermined angle (for example, 90 degrees). When both of (B-1) and (B-2) are satisfied, the traveling of a vehicle in an opposite direction is detected, and, when at least one of (B-1) and (B-2) is not satisfied, the traveling of a vehicle in an opposite direction is not detected.

(C) The low velocity traveling of a vehicle is detected on a condition that the vehicle is continuously traveling at a predetermined velocity or less for a predetermined time length or more, for example. The predetermined velocity herein may be the same as or different from a predetermined velocity defining low velocity traveling in (A) the traffic jam.

(D) The stop of a vehicle is detected on a condition that the vehicle is continuously stopping (a vehicle position falls within a predetermined range) for a predetermined time length or more, for example.

(E) The fallen object is detected on one or both of (E-1) a condition that an object other than a vehicle is present on a road, and (E-2) a condition that a predetermined number or more of vehicles perform a temporary lane change in a common range, for example. When either one of (E-1) and (E-2) is satisfied, the fallen object is detected, and, when both of (E-1) and (E-2) are not satisfied, the fallen object is not detected.

The temporary lane change indicates that a vehicle changes a lane, and then returns to an original lane within a predetermined distance or a predetermined time. In general, a vehicle travels while avoiding a fallen object, and thus it is estimated that the fallen object is present in a range commonly avoided by a plurality of vehicles. Thus, a fallen object can be detected by using (E-2).

(F) The zigzag traveling is detected on a condition that a vehicle repeats a temporary lane change for a predetermined number of times or more, for example. As described above, the temporary lane change indicates that a vehicle changes a lane, and then returns to an original lane within a predetermined distance or a predetermined time.

(4-3) The road unique information is predetermined information about a road.

For example, the road unique information may be at least one of a traveling direction on a road, a name of a road, information for identifying a section of a road, and information for identifying a lane of a road. For example, the traveling direction on a road may be predetermined by law and the like, and, when a lane is not distinguished on the road, the traveling direction may be a traveling direction on the entire road, and, when a lane is distinguished on the road, the traveling direction may be a traveling direction on each lane.

In the present example embodiment, description will be given by using an example in which the capturing situation information includes a part of (1) the capturing timing, (2) the capturing condition, (3) the apparatus information, and (4) the road information described above. Specifically, as illustrated in FIG. 7, description will be given by using an example in which (1) the capturing timing is a time classification of morning, daytime, evening, and night. Description will be given by using an example in which (2) the capturing condition includes an irradiation state and weather. Description will be given by using an example in which (3) the apparatus information includes a capturing ID and a depression angle in a capturing direction. Description will be given by using an example in which (4) the road information includes a road state, an event, and road unique information. Further, description will be given by using an example in which the road unique information is a traveling direction.

Figure 8:
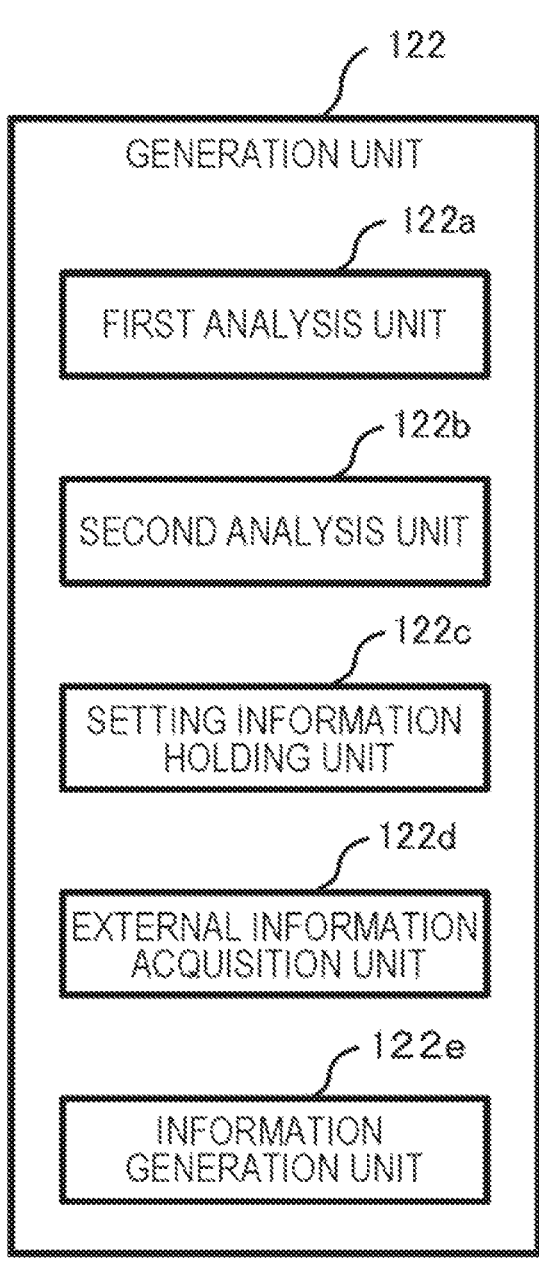
FIG. 8 is a diagram illustrating a functional configuration example of a generation unit according to the example embodiment 1.

FIG. 8 is a diagram illustrating a functional configuration example of the generation unit 122 according to the example embodiment 1. The generation unit 122 includes a first analysis unit 122a, a second analysis unit 122b, a setting information holding unit 122c, an external information acquisition unit 122d, and an information generation unit 122e.

The first analysis unit 122a acquires a capturing condition by processing an image acquired by the image acquisition unit 121.

The second analysis unit 122b acquires road information by processing an image acquired by the image acquisition unit 121.

Each of such a first analysis unit 122a and a second analysis unit 122b is an example of a means for processing an image and generating capturing situation information.

A general technique such as pattern matching, a machine learning model, and the like may be used for a method for processing an image by each of the first analysis unit 122a and the second analysis unit 122b. In the present example embodiment, description will be given with an example of using a machine learning model.

In other words, the first analysis unit 122a according to the present example embodiment acquires a capturing condition by using a first analysis model with, as an input, an image (i.e., an image in which a road is captured) acquired by the image acquisition unit 121. The first analysis model is a machine learning model that has learned in order to process an image in which a road is captured and acquire a capturing condition.

Further, the second analysis unit 122b according to the present example embodiment acquires road information by using a second analysis model with, as an input, an image (i.e., an image in which a road is captured) acquired by the image acquisition unit 121. The second analysis model is a machine learning model that has learned in order to process an image in which a road is captured and acquire road information.

The first analysis model and the second analysis model are formed by using a neural network. In the present example embodiment, description will be given with an example in which the first analysis model and the second analysis model are formed by using neural networks independent of each other.

Note that, the first analysis model and the second analysis model may be formed by using a common neural network. An analysis model in this case is, for example, a machine learning model that has learned in order to process an image in which a road is captured and acquire a capturing condition and road information. For example, the first analysis unit 122a and the second analysis unit 122b in this case may acquire a capturing condition and road information by using a common analysis model with, as an input, an image (i.e., an image in which a road is captured) acquired by the image acquisition unit 121.

The setting information holding unit 122c holds setting information. The setting information is information set for processing an image.

The setting information may be set by an appropriate method, and is set to the setting information holding unit 122c by an input of a user, for example. Note that, a plurality of patterns (setting patterns) of setting information may be prepared for the capturing apparatus 101. Then, the setting information may be set by selecting any of the plurality of setting patterns by a user.

The external information acquisition unit 122*d* acquires external information from an external apparatus. Specifically, for example, the external information acquisition unit 122*d* acquires external information from an external apparatus that is not illustrated via the network N.

The information generation unit 122*e* generates capturing situation information. The information generation unit 122*e* according to the present example embodiment generates capturing situation information by using a capturing condition, road information, image information, setting information, and external information.

FIG. 6 is referred again.

The storage processing unit 123 performs processing for storing an image, based on the capturing situation information.

The storage processing unit 123 according to the present example embodiment generates learning information, and stores the generated learning information in the recording apparatus 103.

The learning information includes, as a machine learning image, an image included in image information acquired by the image acquisition unit 121. Further, the learning information includes capturing situation information. The capturing situation information included in the learning information may be the entire capturing situation information generated by the information generation unit 122*e*, or may be a predetermined part of the capturing situation information. In other words, the learning information includes at least a part of the capturing situation information.

The storage processing unit 123 according to the present example embodiment associates an image as a machine learning image with at least a part of the capturing situation information generated by the information generation unit 122*e*. In this way, the storage processing unit 123 generates learning information in which the image and at least a part of the capturing situation information are associated with each other.

Then, by transmitting the generated learning information to the recording apparatus 103, the storage processing unit 123 stores the learning information in the recording apparatus 103.

The surveillance information transmission unit 124 transmits surveillance information used for surveying a road to the second information processing apparatus 104. The surveillance information is, for example, information including at least one of image information, a capturing condition, road information, setting information, external information, and the like. The surveillance information and the learning information may include different pieces of information due to a different use of information, but may be the same.

The learning unit 125 causes a machine learning model to learn by using training data in which a correct label is provided to an image (machine learning image) included in the learning information.

In the present example embodiment, the learning unit 125 causes, for example, each of the first analysis model and the second analysis model to learn. Note that, a machine learning model caused to learn by the learning unit 125 may not be limited to the first analysis model and the second analysis model.

Figure 9:
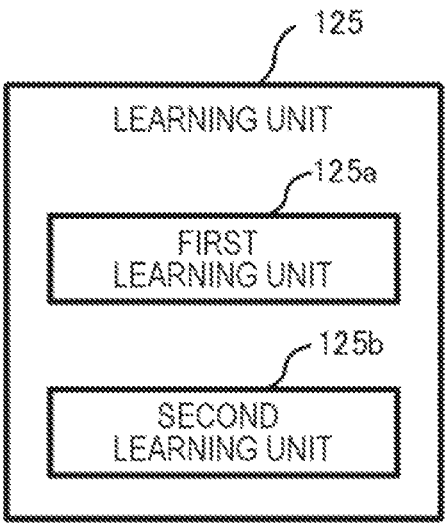
FIG. 9 is a diagram illustrating a functional configuration of a learning unit according to the example embodiment 1.

FIG. 9 is a diagram illustrating a functional configuration of the learning unit 125 according to the example embodiment 1. The learning unit 125 includes a first learning unit 125*a* and a second learning unit 125*b*.

The first learning unit 125*a* causes the first analysis model to learn by using training data in which a correct label is provided to an image.

The second learning unit 125*b* causes the second analysis model to learn by using training data in which a correct label is provided to an image.

An image used for learning by the first learning unit 125*a* is an image included in learning information, i.e., a machine learning image. Further, a general method or technique may be adopted for a method for creating training data. For example, a user may provide a correct label to a machine learning image by using the first learning unit 125*a*, the second learning unit 125*b*, another appropriate apparatus, and the like. When the first analysis model and the second analysis model are independent of each other as in the present example embodiment, correct labels may be different from each other in training data used for each learning.

FIG. 4 is referred again.

The recording apparatus 103 is an apparatus for storing a machine learning image, and corresponds to a learning information storage means. When the recording apparatus 103 according to the present example embodiment acquires learning information including a machine learning image from the first information processing apparatus 102, the recording apparatus 103 stores the learning information.

The second information processing apparatus 104 displays an image for surveying a road.

Specifically, for example, when the second information processing apparatus 104 acquires surveillance information from the first information processing apparatus 102, the second information processing apparatus 104 displays the surveillance information on a display unit.

The functional configuration example of the information processing system 100 according to the example embodiment 1 is mainly described above. Hereinafter, a physical configuration example of the information processing system 100 according to the example embodiment 1 will be described.

(Physical Configuration Example of Information Processing System 100)

The information processing system 100 physically includes, for example, the capturing apparatus 101, the first information processing apparatus 102, the recording apparatus 103, and the second information processing apparatus 104.

Note that, a physical configuration of the information processing system 100 is not limited thereto. For example, functions of the capturing apparatus 101, the two information processing apparatuses 102 and 104, and the recording apparatus 103 described in the present example embodiment may be physically provided to one apparatus, or may be divided and provided to each of a plurality of apparatuses in a manner different from the present example embodiment. When a function of transmitting or receiving information between the apparatuses 101 to 104 according to the present example embodiment via the network N is physically incorporated into a common apparatus, the information may be transmitted or acquired via an internal bus and the like instead of the network N.

(Physical Configuration Example of Capturing Apparatus 101)

Figure 10:
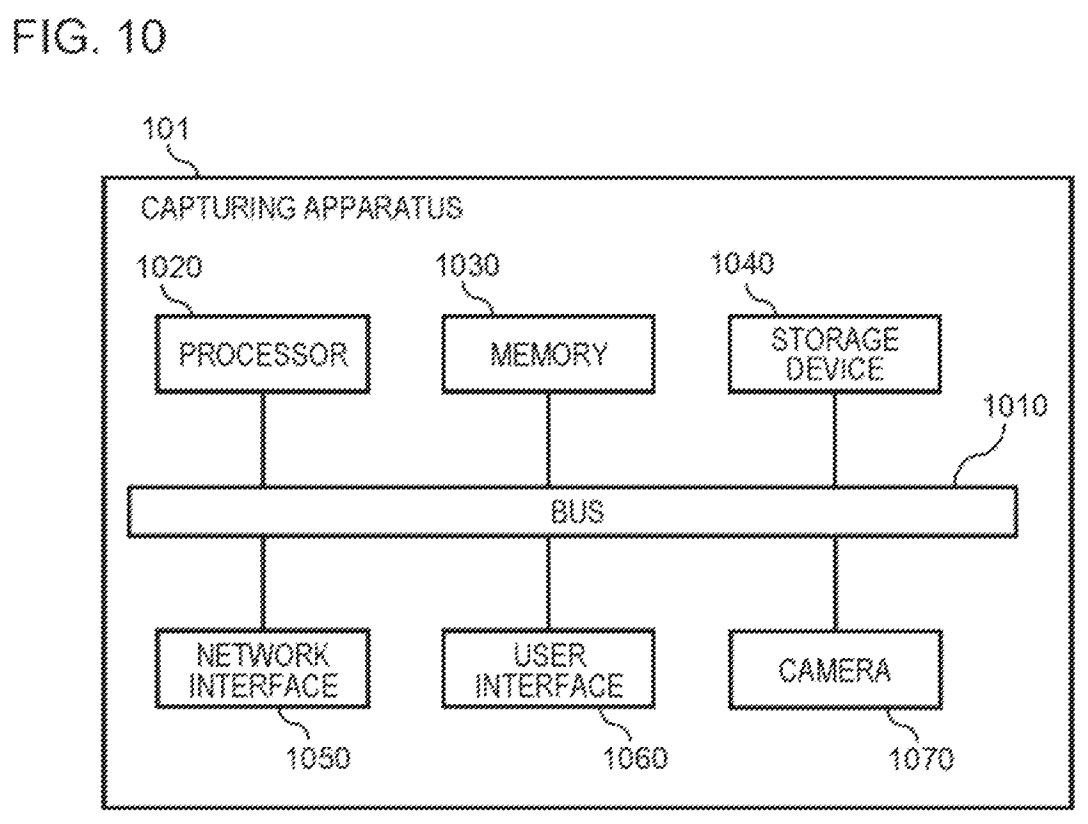

FIG. 10 is a diagram illustrating a physical configuration example of the capturing apparatus 101 according to the example embodiment 1. The capturing apparatus 101 physically includes, for example, a bus 1010, a processor 1020, a memory 1030, a storage device 1040, a network interface 1050, a user interface 1060, and a camera 1070.

The bus 1010 is a data transmission path for allowing the processor 1020, the memory 1030, the storage device 1040, the network interface 1050, the user interface 1060, and the camera 1070 to transmit and receive data with one another. However, a method for connecting the processor 1020 and the like to one another is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module for achieving each function of the capturing apparatus 101. The processor 1020 reads each program module onto the memory 1030 and executes the program module, and each function associated with the program module is achieved.

The network interface 1050 is an interface for connecting the capturing apparatus 101 to the network N.

The user interface 1060 is a touch panel, a keyboard, a mouse, and the like as an interface for inputting information by a user, and is a liquid crystal panel, an organic electro-luminescence (EL) panel, and the like as an interface for providing information to a user.

The camera 1070 captures a subject such as a road, and generates an image of the subject. For example, the capturing apparatus 101 is installed beside a road, above a road, and the like in such a way that the camera 1070 can capture a predetermined place on the road.

Note that, the capturing apparatus 101 may receive an input from a user or may provide information to a user via an external apparatus (for example, the first information processing apparatus 102, the second information processing apparatus 104, and the like) connected to the network N. In this case, the capturing apparatus 101 may not include the user interface 1060.

(Physical Configuration Example of First Information Processing Apparatus 102, Recording Apparatus 103, and Second Information Processing Apparatus 104)

FIG. 11 is a diagram illustrating a physical configuration example of the first information processing apparatus 102 according to the example embodiment 1. The first information processing apparatus 102 physically includes, for example, the bus 1010, the processor 1020, the memory 1030, the storage device 1040, and the network interface 1050 similar to those of the capturing apparatus 101. The first information processing apparatus 102 further physically includes, for example an input interface 2060 and an output interface 2070.

However, the storage device 1040 of the first information processing apparatus 102 stores a program module for achieving each function of the first information processing apparatus 102. Further, the network interface 1050 of the first information processing apparatus 102 is an interface for connecting the first information processing apparatus 102 to the network N.

The input interface 2060 is an interface for a user to input information, and includes, for example, a touch panel, a keyboard, a mouse, and the like. The output interface 2070 is an interface for providing information to a user, and includes, for example, a liquid crystal panel, an organic EL panel, and the like.

Each of the recording apparatus 103 and the second information processing apparatus 104 according to the example embodiment 1 may be physically configured similarly to the first information processing apparatus 102, for example. However, each of the storage device 1040 of the recording apparatus 103 and the storage device 1040 of the second information processing apparatus 104 stores a program module for achieving each function of the recording apparatus 103 and the second information processing apparatus 104. Further, the network interface 1050 of the recording apparatus 103 and the second information processing apparatus 104 is an interface for connecting each of the recording apparatus 103 and the second information processing apparatus 104 to the network N.

The configuration example of the information processing system 100 according to the example embodiment 1 is described above. Hereinafter, an operation example of the information processing system 100 according to the example embodiment 1 will be described.

(Operation Example of Information Processing System 100)

The information processing system 100 performs information processing for collecting a machine learning image. The information processing according to the present example embodiment includes, for example, capturing processing, first information processing, recording processing, second information processing, and learning processing. The processing will be described with reference to the drawing.

(Example of Capturing Processing According to Example Embodiment 1)

Figure 12:
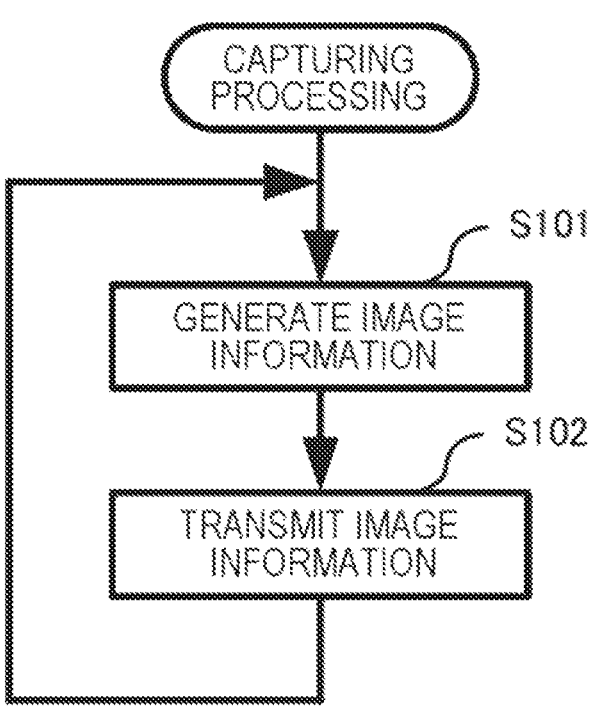
FIG. 12 is a flowchart illustrating one example of capturing processing according to the example embodiment 1.

FIG. 12 is a flowchart illustrating one example of the capturing processing according to the example embodiment 1. The capturing processing is processing for capturing a road. For example, when the capturing apparatus 101 receives a start instruction by a user via the second information processing apparatus 104, the capturing apparatus 101 repeatedly performs the capturing processing with a predetermined frequency until an end instruction by a user is received. Note that, a method for starting or ending the capturing processing is not limited thereto.

The capturing apparatus 101 captures a road, and generates image information (step S101).

Specifically, for example, when the camera 1070 captures a predetermined place on a road, the capturing apparatus 101 generates image information including an image acquired by the capturing.

Figure 13:
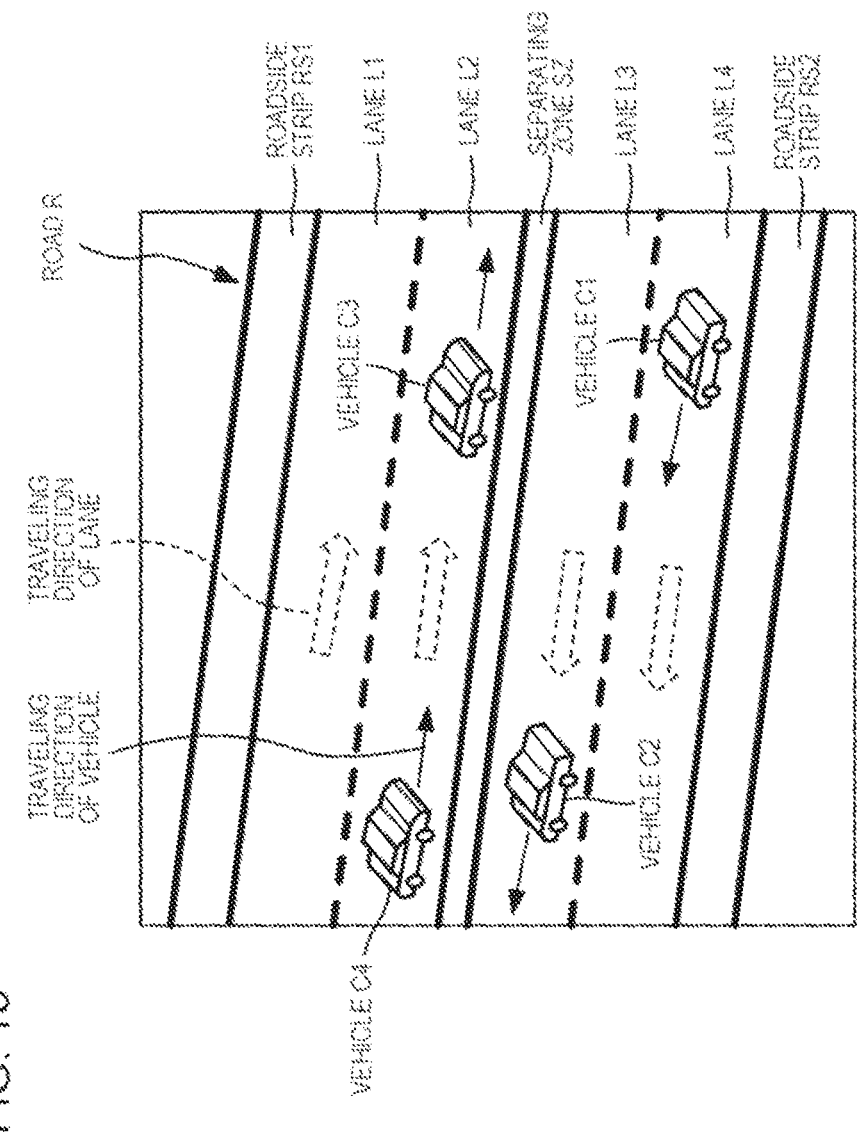
FIG. 13 is a diagram illustrating one example of a road R to be captured.

FIG. 13 is a diagram illustrating one example of a road R to be captured.

The road R includes roadside strips RS1 and RS2 provided along both sides of the road R, and a separating zone SZ provided at substantially the center along the road. The road R further includes lanes L1 and L2 provided between the roadside strip RS1 and the separating zone SZ, and lanes L3 and L4 provided between the roadside strip RS2 and the separating zone SZ. Road lamps M1 to M4 that illuminate the lanes L1 to L4, respectively, are provided on a side portion of the road R.

An arrow represented by a dotted line in FIG. 13 indicates a traveling direction determined in each of the lanes. Vehicles C1, C2, C3, and C4 are traveling on the road R. An arrow of a solid line in FIG. 13 indicates a traveling direction of a vehicle.

Figure 14:
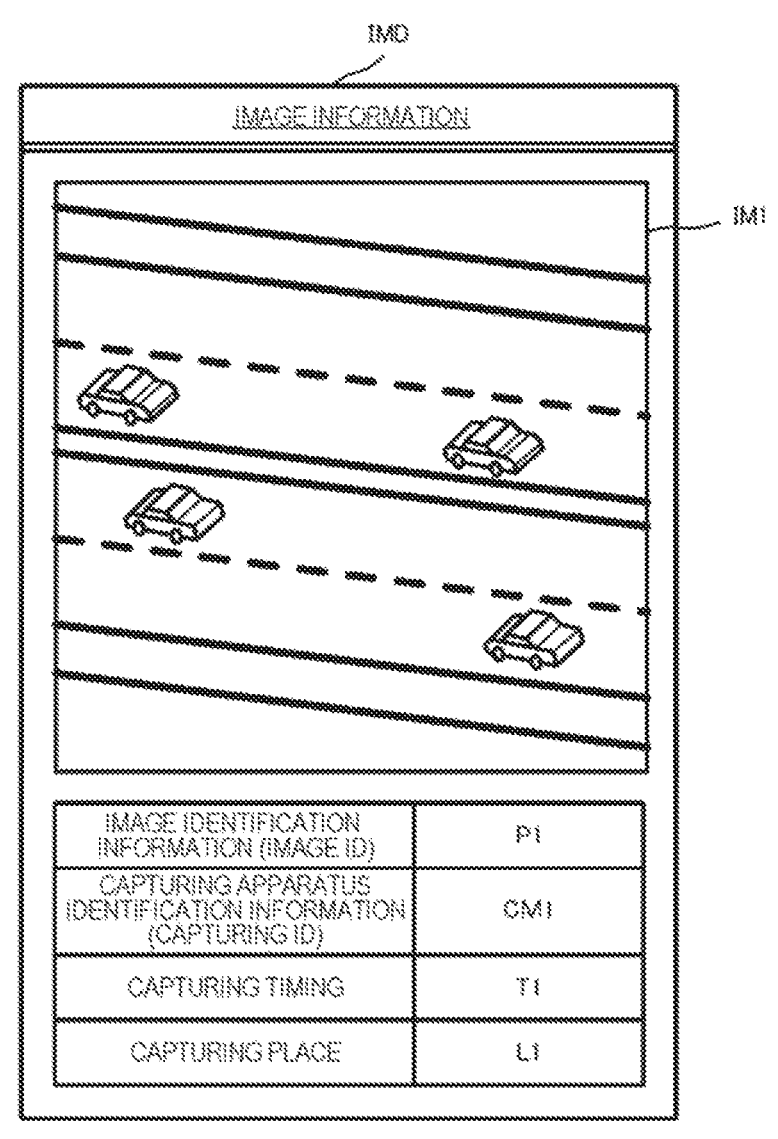
FIG. 14 is a diagram illustrating one example of image information IMD including a frame image IM1 in which the road R illustrated in FIG. 13 is captured.

FIG. 14 is a diagram illustrating one example of image information IMD including a frame image IM1 in which the road R illustrated in FIG. 13 is captured. The image information IMD illustrated in FIG. 14 associates image accompanying information with the frame image IM1. The image accompanying information illustrated in FIG. 14 associates an image ID "P1", a capturing ID "CM1", a capturing timing "T1", and a capturing place "L1" with one another.

"P1" is an image ID provided to the frame image IM1. For example, the capturing apparatus 101 may provide the image ID of the image IM1 according to a predetermined rule, and may set the image ID to the image information IMD.

"CM1" is a capturing ID of the capturing apparatus 101. For example, the capturing apparatus 101 may hold a capturing ID preset by a user via the second information processing apparatus 104, and may set the capturing ID to the image information IMD.

"T1" indicates a timing at which the frame image IM1 is captured. The capturing apparatus 101 has, for example, a timer function, and may set a time during capturing as a capturing timing to the image information IMD.

"L1" is information indicating a place captured by the capturing apparatus 101. For example, the capturing apparatus 101 may hold, in advance, a capturing place (for example, an installation place of the capturing apparatus 101) preset by a user via the second information processing apparatus 104, and may set the capturing place to the image information IMD.

FIG. 12 is referred again.

The capturing apparatus 101 transmits the image information generated in step S101 to the first information processing apparatus 102 (step S102), and the processing returns to step S101.

Such capturing processing can transmit a video (i.e., each image captured at a predetermined frame rate) to the first information processing apparatus 102 in substantially real time.

Note that, step S102 may be performed at a preset time interval in such a way as to transmit image information about a part of a captured image. Further, a video may not be transmitted in real time, and, for example, the capturing apparatus 101 may store image information and transmit the image information including a plurality of images at a predetermined timing.

(Example of First Information Processing According to Example Embodiment 1)

Figure 15:
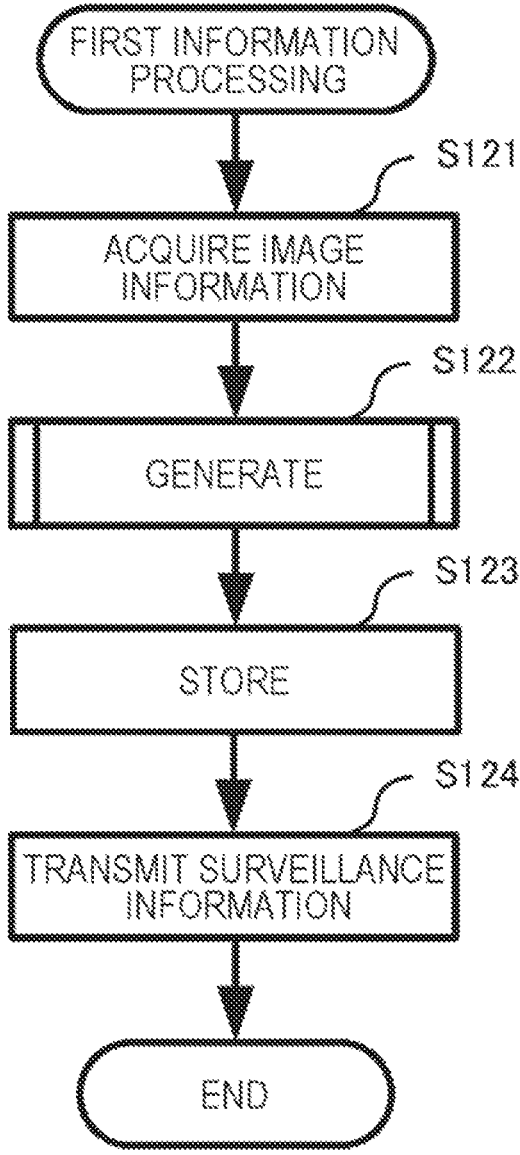
FIG. 15 is a flowchart illustrating one example of first information processing according to the example embodiment 1.

FIG. 15 is a flowchart illustrating one example of the first information processing according to the example embodiment 1. The first information processing is processing for generating and storing capturing situation information. For example, similarly to the capturing apparatus 101, when the first information processing apparatus 102 receives a start instruction by a user via the second information processing apparatus 104, the first information processing apparatus 102 repeatedly performs the first information processing until an end instruction by a user is received. Note that, a method for starting or ending the first information processing is not limited thereto.

The image acquisition unit 121 acquires the image information transmitted in step S102 (step S121).

The generation unit 122 processes an image in which a road is captured, and generates capturing situation information (step S122).

Figure 16:
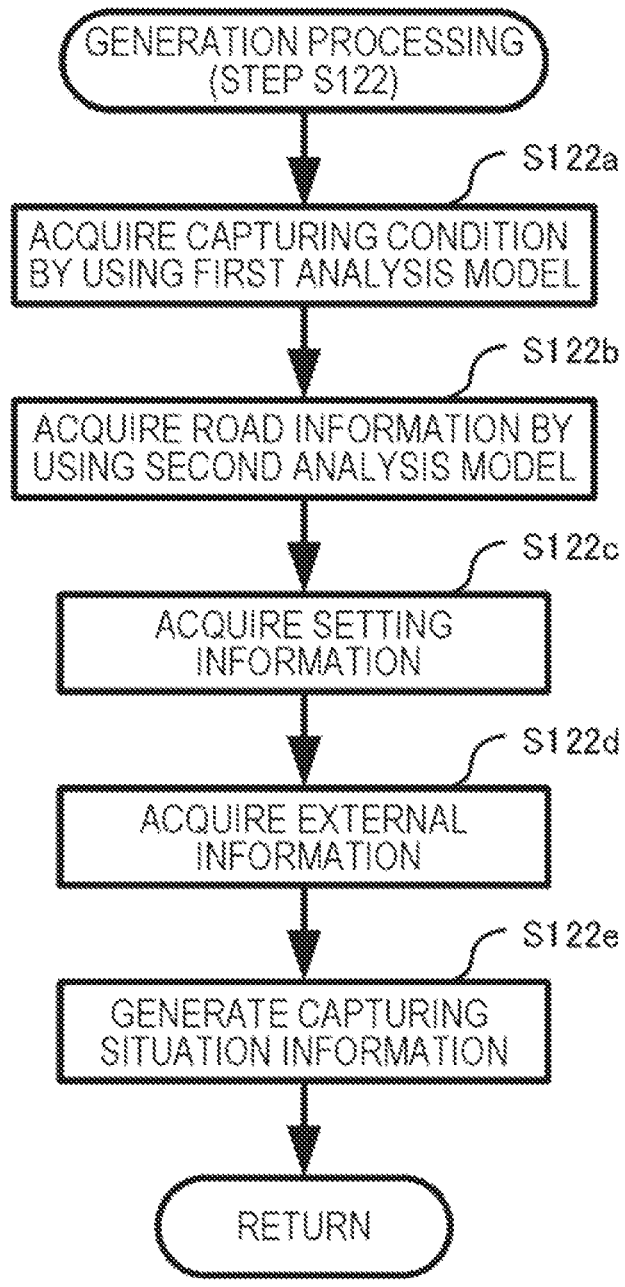
FIG. 16 is a flowchart illustrating one example of generation processing according to the example embodiment 1.

FIG. 16 is a flowchart illustrating one example of the generation processing (step S122) according to the example embodiment 1.

The first analysis unit 122a acquires a capturing condition by processing an image included in the image information acquired in step S121 (step S122a).

Specifically, for example, the first analysis unit 122a acquires an irradiation state by using a first analysis model with, as an input, the image (i.e., an image in which a road is captured) acquired in step S121. The irradiation state is, for example, backlight, front light, oblique light, and the like.

The second analysis unit 122b acquires road information by processing the image included in the image information acquired in step S121 (step S122b).

Specifically, for example, the second analysis unit 122b acquires a road state and an event by using a second analysis model with, as an input, the image (i.e., the image in which the road is captured) acquired in step S121. At this time, the second analysis unit 122b may use setting information held by the setting information holding unit 122c as necessary.

Figure 17:
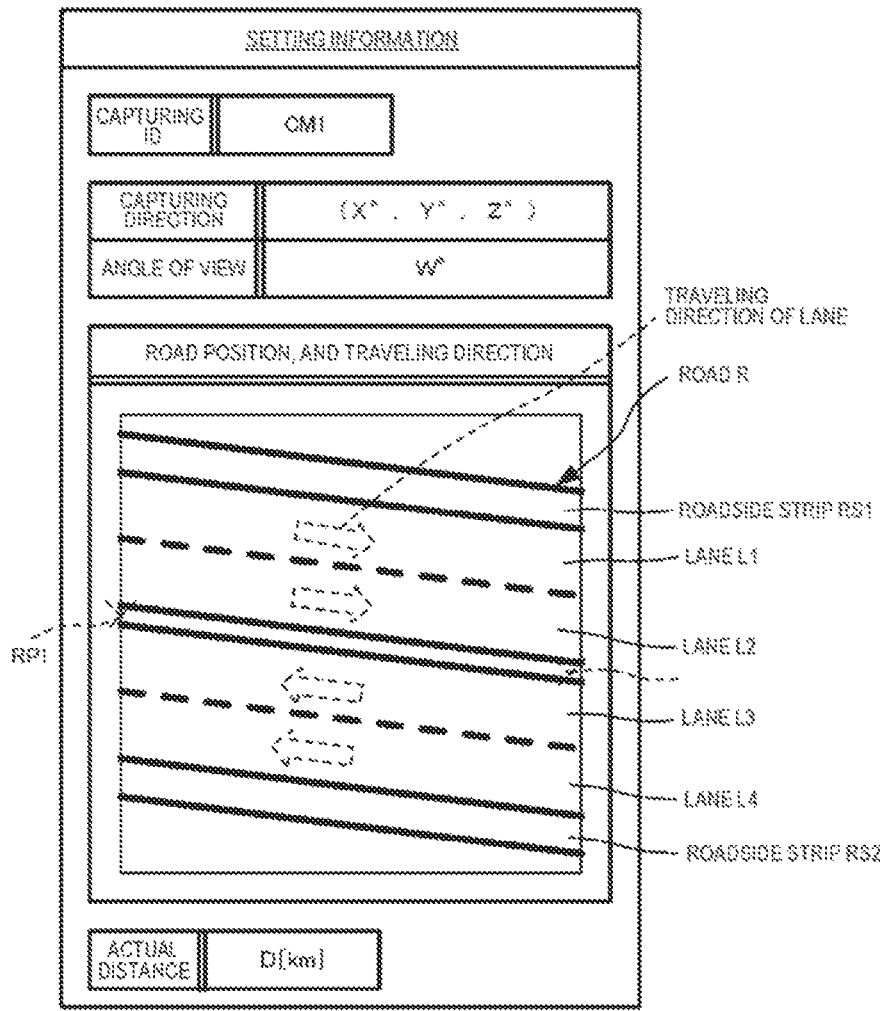
FIG. 17 is one example of setting information according to the example embodiment 1.

FIG. 17 is one example of the setting information according to the example embodiment 1. The setting information includes, for example, a capturing ID, a capturing direction, an angle of view, a road position, a traveling direction, actual distance information. Note that, the setting information is not limited thereto.

The setting information illustrated in FIG. 17 is an example in which a capturing direction of the capturing apparatus 101, an angle of view, a road position, a traveling direction, and actual distance information being identified by using the capturing ID "CM1" are associated with the capturing ID "CM1".

The capturing direction is, for example, information indicating an angle with respect to a predetermined reference direction. The example in FIG. 17 illustrates an example in which the capturing direction is represented by an angle ($X°$, $Y°$, and $Z°$) in each of a pan direction, a tilt direction, and a roll direction. The angle in the tilt direction corresponds to, for example, a depression angle of the capturing apparatus 101 in the capturing direction.

The angle of view is information indicating an angle in a capturing range viewed from the capturing apparatus 101. The angle of view is, for example, an angle in a capturing range in a diagonal direction of a capturing element installed in the capturing apparatus 101. Note that, instead of the angle of view or in addition to the angle of view, a focal distance of a lens may be adopted in the capturing apparatus 101.

The road position is information indicating a position of a road in an image captured by the capturing apparatus 101 according to the capturing direction and the angle of view. The traveling direction is information indicating a traveling direction on a road, and is represented by, for example, a vector indicating a direction in an image captured by the capturing apparatus 101 according to the capturing direction and the angle of view. In the example in FIG. 17, the road position of the road R is represented by a position (straight line) in an image, and the traveling direction is represented by an arrow associated with each of the lanes L1 to L4 constituting the road R.

The actual distance information is information indicating an actual distance between reference points in an image. In the example in FIG. 17, an actual distance D [km] indicates an actual distance between reference points RP1 and RP2 provided in the example of the image for description. The reference points RP1 and RP2 may be appropriately set.

FIG. 16 is referred again.

The information generation unit 122e acquires the setting information from the setting information holding unit 122c (step S122c).

The external information acquisition unit 122d acquires external information from an external apparatus (step S122d).

Specifically, for example, the external information may include weather in a capturing range of the capturing apparatus 101.

The information generation unit 122e generates capturing situation information by using the image information, the capturing condition, the road information, the setting information, and the external information being acquired in steps S121 and S122a to S122d (step S122e).

Specifically, for example, as described with reference to FIG. 7, the capturing situation information according to the present example embodiment includes (1) a time classification of morning, daytime, evening, and night, (2) an irradiation state and weather, (3) a capturing ID and a depression angle in a capturing direction, and (4) a road state, an event, and a traveling direction.

For (1) a time classification, the information generation unit 122e acquires a time classification by holding a time period predetermined in association with each of morning, daytime, evening, and night, and determining a time period to which a capturing time included in the image accompanying information acquired in step S121 belongs.

For (2) an irradiation state and weather, the information generation unit 122e uses the irradiation state acquired in step S122a and the weather acquired in step S122d.

For (3) a capturing ID and a depression angle in a capturing direction, the information generation unit 122e uses the capturing ID included in the image accompanying information acquired in step S121, and the angle in the tilt direction included in the setting information acquired in step S122c.

For (4) a road state, an event, and a traveling direction, the information generation unit 122e uses the road state and the event acquired in step S122b, and the traveling direction on the road included in the setting information acquired in step S122c.

Then, the information generation unit 122e generates capturing situation information including the time classification, the irradiation state, the weather, the capturing ID, the depression angle in the capturing direction, the road state, the event, and the traveling direction.

FIG. 15 is referred again.

The storage processing unit 123 performs processing for storing the image, based on the capturing situation information generated in step S122 (step S123).

Specifically, for example, the storage processing unit 123 generates learning information by associating the image acquired in step S121 with the capturing situation information generated in step S122e. The storage processing unit 123 transmits the generated learning information to the recording apparatus 103. In this way, the storage processing unit 123 stores the learning information in the recording apparatus 103.

Note that, the storage processing (step S123) may be performed on only a part of the image information acquired in step S121, for example, for each of a predetermined number of images. In this way, a processing load can be reduced.

In this case, the storage processing unit 123 may generate learning information by commonly associating the capturing situation information generated for an image being a processing target in step S121 with a predetermined number of image groups continuously acquired before or after the image being the processing target.

The surveillance information transmission unit 124 transmits surveillance information including the image acquired in step S121 to the second information processing apparatus 104 (step S124), and ends the first information processing.

Specifically, for example, the surveillance information transmission unit 124 associates the image acquired in step S121 with the road state and the event acquired in step S122b. In this way, the surveillance information transmission unit 124 generates the surveillance information in which the image, the road state, and the event are associated with one another. The surveillance information transmission unit 124 transmits the generated surveillance information to the second information processing apparatus 104.

By performing such first information processing, the image associated with the capturing situation information can be stored in the recording apparatus 103. Further, the surveillance information can be generated and displayed on the second information processing apparatus 104.

(Example of Recording Processing According to Example Embodiment 1)

Figure 18:
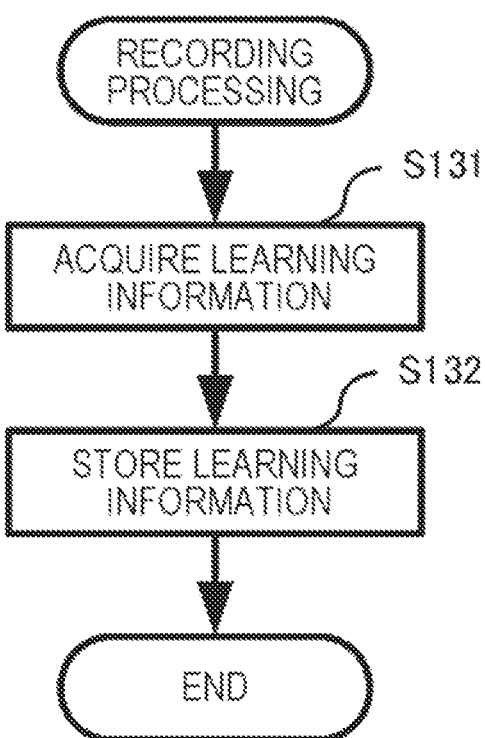
FIG. 18 is a flowchart illustrating one example of recording processing according to the example embodiment 1.

FIG. 18 is a flowchart illustrating one example of the recording processing according to the example embodiment 1. The recording processing is processing of storing learning information. For example, similarly to the capturing apparatus 101, when the recording apparatus 103 receives a start instruction by a user via the second information processing apparatus 104, the recording apparatus 103 repeatedly performs the first information processing until an end instruction by a user is received. Note that, a method for starting or ending the recording processing is not limited thereto.

The recording apparatus 103 acquires the learning information transmitted in step S124 (step S131).

The recording apparatus 103 stores the learning information acquired in step S131 (step S132), and ends the recording processing.

Specifically, for example, the recording apparatus 103 includes a storage unit (not illustrated) formed of the storage device 1040 and the like of the recording apparatus 103. The recording apparatus 103 stores the learning information acquired in step S131 in the storage unit.

By performing such recording processing, learning information in which an image in which a road is captured is associated with capturing situation information about the image can be stored in the recording apparatus 103.

(Example of Second Information Processing According to Example Embodiment 1)

Figure 19:
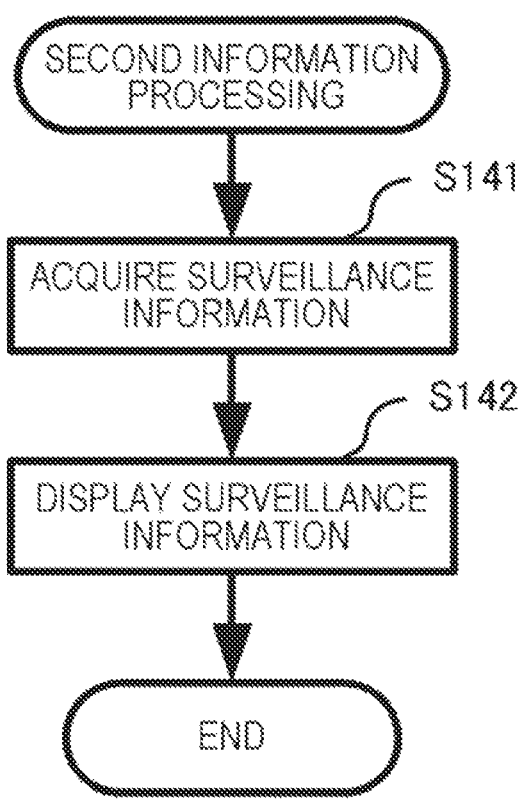
FIG. 19 is a flowchart illustrating one example of second information processing according to the example embodiment 1.

FIG. 19 is a flowchart illustrating one example of the second information processing according to the example embodiment 1. The second information processing is processing for surveying a road by using surveillance information by a user.

For example, when the second information processing apparatus 104 receives a start instruction by a user, the second information processing apparatus 104 transmits the start instruction to the capturing apparatus 101, the first information processing apparatus 102, and the recording apparatus 103, and also starts the first information processing. Then, for example, when the second information processing apparatus 104 receives an end instruction by a user, the second information processing apparatus 104 transmits the end instruction to the capturing apparatus 101, the first information processing apparatus 102, and the recording apparatus 103, and also ends the surveillance processing. In other words, for example, when the second information processing apparatus 104 receives a start instruction by a user, the second information processing apparatus 104 repeatedly performs the second information processing until an end instruction by a user is received. Note that, a method for starting or ending the second information processing is not limited thereto.

The second information processing apparatus 104 acquires the surveillance information transmitted in step S124 (step S141).

The second information processing apparatus 104 displays the surveillance information acquired in step S141 (step S142), and ends the second information processing.

Specifically, for example, the second information processing apparatus 104 includes a display unit (not illustrated) formed of the output interface 2070 and the like of the second information processing apparatus 104. When the second information processing apparatus 104 acquires surveillance information from the first information processing apparatus 102, the second information processing apparatus 104 displays the surveillance information on the display unit.

Figure 20:
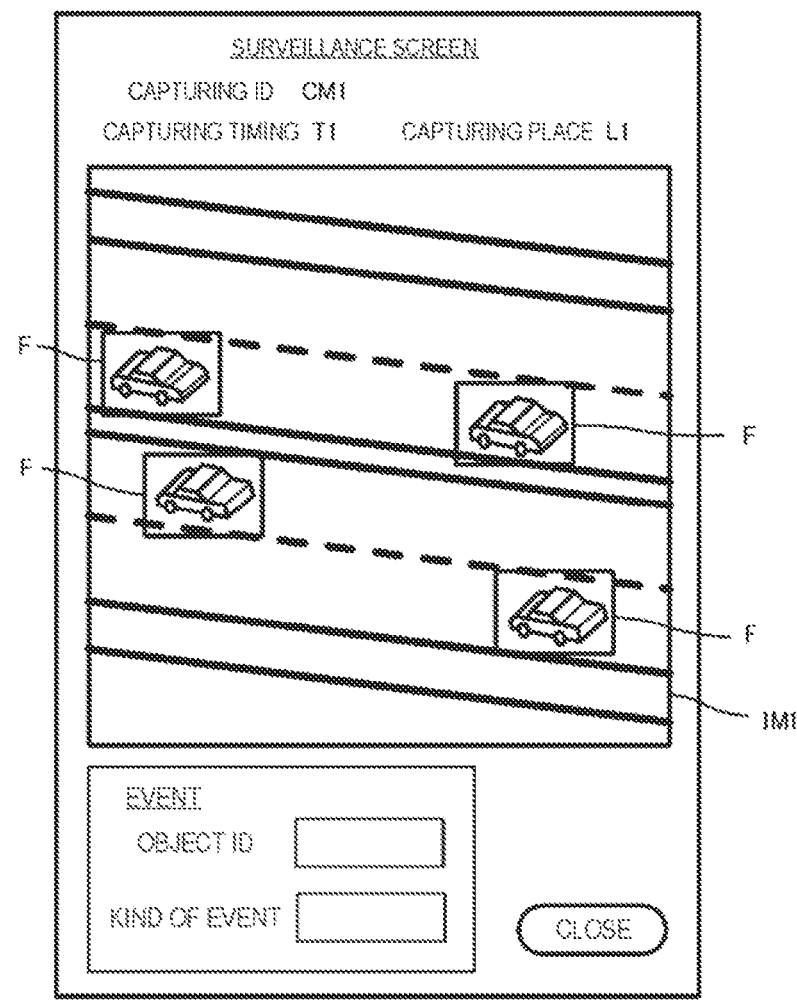
FIG. 20 is a diagram illustrating an example of a surveillance screen that displays surveillance information.

FIG. 20 is a diagram illustrating an example of a surveillance screen that displays surveillance information.

The surveillance screen illustrated in FIG. 20 includes the frame image IM1, a capturing ID of the capturing apparatus 101 that captures the frame image IM1, and a capturing timing and a capturing place of the frame image IM1. Further, the surveillance screen illustrated in FIG. 20 includes a frame F being an indicator for identifying each object included in the frame image IM1. The frame F is indicated over the frame image IM1 in such a way as to surround each of the vehicles C1 to C4 being an object included in the frame image IM1. Further, since an event is not detected, an object ID and a kind of the event being an example of information about the event are blank in the screen illustrated in FIG. 20.

The second information processing apparatus 104 continues to display the screen illustrated in FIG. 20 on the display unit. Then, for example, when a predetermined operation of placing a cursor on a "close" button in the screen and pressing a button of a mouse, and the like is performed, the second information processing apparatus 104 ends the display of the surveillance screen, and ends the second information processing.

Note that, the screen that displays the surveillance screen is not limited thereto, and, for example, the information and the like included in the surveillance screen may be appropriately changed. Further, for example, in a case of a plurality of the capturing apparatuses 101, the plurality of the capturing apparatuses 101 capture a different place on a road as described above. Thus, the second information processing apparatus 104 may display a surveillance screen disposed in such a way that images in which adjacent capturing ranges along a road are captured are continuous, or are located close to each other.

By performing such second information processing, a user can survey a road by viewing the surveillance information.

(Example of Learning Processing According to Example Embodiment 1)

Figure 21:
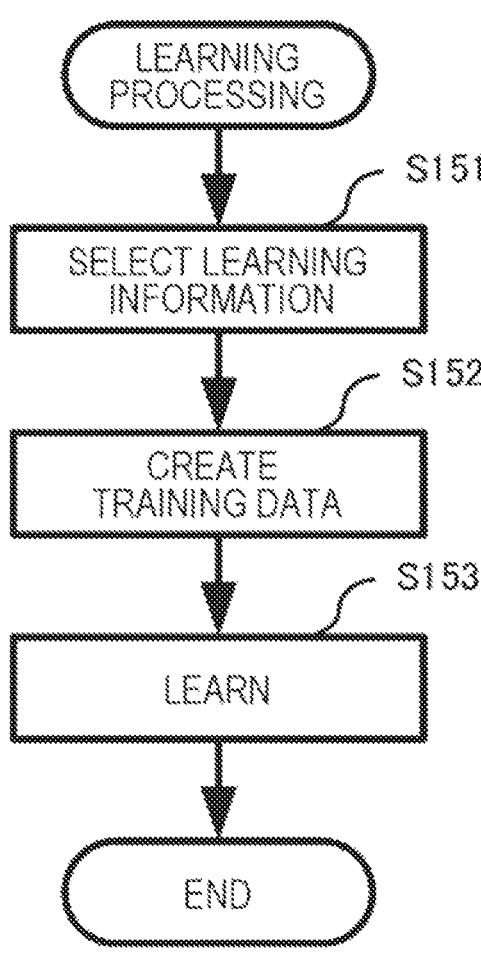
FIG. 21 is a flowchart illustrating one example of learning processing according to the example embodiment 1.

FIG. 21 is a flowchart illustrating one example of the learning processing according to the example embodiment 1. The learning processing is processing for causing a machine learning model to learn by using a machine learning image (i.e., an image included in learning information). Herein, an example of the learning processing for causing the second analysis model to learn will be described.

The second learning unit 125b selects, from the learning information stored in the recording apparatus 103, learning information that satisfies a selection condition specified by a user in relation to a capturing situation (step S151).

Specifically, for example, the user specifies, as a selection condition, a capturing situation having a high possibility that learning of the second analysis model is not sufficient.

In general, there is a high possibility that learning of the second analysis model is not sufficient for an image of a capturing situation having a small data amount such as an image on a snow day. Further, there is a high possibility that learning of the second analysis model is not sufficient for an image that is difficult to analyze such as an image having a low depression angle. Furthermore, there is a high possibility that learning of the second analysis model is not sufficient for an image of a capturing situation having a low degree of reliability of being output from the second analysis model together with an analysis result (in the present example embodiment, a road state and an event). The user may specify a capturing situation of such an image as a selection condition. Note that, a capturing situation herein having a high possibility that learning is not sufficient is an exemplification, which is not limited thereto.

The second learning unit 125b selects learning information that satisfies a specified selection condition from the learning information stored in the recording apparatus 103. In this way, an image that satisfies the selection condition can be selected.

The second learning unit 125b acquires the learning information selected in step S151 from the recording apparatus 103. Then, the second learning unit 125b creates training data by providing a correct label to an image (machine learning image) included in the acquired learning information according to an input of the user (step S152).

Specifically, for example, the second learning unit 125b creates training data by providing a correct label to the machine learning image acquired in step S151 according to an input of the user.

When training data for learning of the second analysis model are created, for example, a user refers to a machine learning image, and inputs a correct label of each object included in the machine learning image. The correct label is, for example, coordinates in an image at a predetermined place such as the center of an object included in a machine learning image, a horizontal size and a vertical size of the object, and a kind of the object, and the like. A kind of an object is, for example, a vehicle, an object, and the like, and, when an object is a vehicle, a kind of the object may be a kind of the vehicle and the like.

For example, when the second learning unit 125b receives an instruction for starting learning from the user, the second learning unit 125b uses the training data created in step S152, performs learning of the second analysis model (step S153), and ends the learning processing.

Such learning processing can select an image by using a capturing situation. Thus, a machine learning model can be caused to learn by predominantly using an image of a capturing situation having a high possibility that learning is not sufficient.

Herein, learning of the second analysis model is described as an example, but the first analysis model can also be caused to learn according to similar learning processing. Specifically, processing in which the "second learning unit 125b" and the "second analysis model" are replaced with the "first learning unit 125a" and the "first analysis model", respectively, in the description of the learning processing described above may be performed. However, a correct label provided to a machine learning image for learning of the second analysis model is, for example, a capturing condition for the machine learning image, and is an irradiation state such as backlight, front light, and oblique light in the present example embodiment. Note that, the learning processing can be applied to learning of another machine learning model for analyzing an image in which a road is captured without being limited to the first analysis model and the second analysis model.

(Action and Effect)

As described above, according to the example embodiment 1, the information processing system 100 is an information processing system for collecting a machine learning image, and includes the generation unit 122 and the storage processing unit 123. The generation unit 122 processes an image in which a road is captured, and generates capturing situation information indicating a situation related to capturing of the image. The storage processing unit 123 performs processing for storing an image, based on the capturing situation information.

In this way, for example, by selecting an image by using a capturing situation and the like, a machine learning model can be caused to learn by predominantly using an image of a capturing situation having a high possibility that learning is not sufficient. Therefore, accuracy of a result acquired by analyzing, by using the machine learning model, an image in which a road is captured can be improved.

According to the example embodiment 1, capturing situation information includes at least one of a capturing timing, a capturing condition, apparatus information about a capturing apparatus that captures an image, and road information about a road captured in an image.

In this way, an image can be appropriately selected by using a capturing situation including the items, and thus a machine learning model can be caused to learn by predominantly using an image of a capturing situation having a high possibility that learning is not sufficient. Therefore, accuracy of a result acquired by analyzing, by using the machine learning model, an image in which a road is captured can be improved.

According to the example embodiment 1, a capturing condition includes at least one of an irradiation state, weather, exposure information, and brightness information about an image. Apparatus information includes at least one of a capturing range, information for identifying a capturing apparatus, and a depression angle of a capturing apparatus in a capturing direction. Road information includes at least one of a road state indicating a state of a road, an event that occurs on a road, and road unique information being predetermined information about a road.

In this way, an image can be appropriately selected by using a capturing situation including the items, and thus a machine learning model can be caused to learn by predominantly using an image of a capturing situation having a high possibility that learning is not sufficient. Therefore, accuracy of a result acquired by analyzing, by using the machine learning model, an image in which a road is captured can be improved.

According to the example embodiment 1, the generation unit 122 includes at least one of the first analysis unit 122a and the second analysis unit 122b, and the information generation unit 122e.

The first analysis unit 122a acquires a capturing condition by using the first analysis model that has learned, with an image as an input, in order to process the image in which a road is captured and acquire a capturing condition. The second analysis unit 122b acquires road information by using the second analysis model that has learned, with an image as an input, in order to process the image in which a road is captured and acquire road information. The information generation unit 122e generates capturing situation information by using at least one of the capturing condition and the road information.

In this way, an image can be appropriately selected by using a capturing situation including at least one of the capturing condition acquired by using the first analysis model and the road information acquired by using the second analysis model, and thus a machine learning model can be caused to learn by predominantly using an image of a capturing situation having a high possibility that learning is not sufficient. Therefore, accuracy of a result acquired by analyzing, by using the machine learning model, an image in which a road is captured can be improved.

According to the example embodiment 1, the information processing system 100 further includes the image acquisition unit 121 that acquires image information including an image from the capturing apparatus 101.

The generation unit 122 further includes at least one of the setting information holding unit 122c and the external information acquisition unit 122d. The setting information holding unit 122c holds setting information set for processing an image. The external information acquisition unit 122d acquires external information from an external apparatus.

The information generation unit 122e generates capturing situation information by using at least one of the capturing condition and the road information, the image information, and at least one of the setting information and the external information.

In this way, an image can be appropriately selected by using a capturing situation further including the image information and at least one of the setting information and the external information, and thus a machine learning model can be caused to learn by predominantly using an image of a capturing situation having a high possibility that learning is not sufficient. Therefore, accuracy of a result acquired by analyzing, by using the machine learning model, an image in which a road is captured can be improved.

According to the example embodiment 1, the first analysis model and the second analysis model are formed by using neural networks independent of each other.

In this way, the first analysis model and the second analysis model are independently formed, and thus, in a case where a malfunction occurs, it is easier to determine and correct a cause of the malfunction than when the first analysis model and the second analysis model are formed by using a common neural network. Therefore, maintenance of the information processing system 100 can be facilitated.

Further, the information processing system 100 can be flexibly formed as necessary by mounting the first analysis unit 122a and the second analysis unit 122b on separate apparatuses as necessary, and the like. Therefore, flexibility of a configuration of the information processing system 100 can be improved.

According to the example embodiment 1, the storage processing unit 123 stores, in the recording apparatus 103, learning information in which an image is associated with at least a part of capturing situation information.

In this way, an image can be selected by using a capturing situation, and thus a machine learning model can be caused to learn by predominantly using an image of a capturing situation having a high possibility that learning is not sufficient. Therefore, accuracy of a result acquired by analyzing, by using the machine learning model, an image in which a road is captured can be improved.

According to the example embodiment 1, the information processing system 100 further includes the first learning unit 125$a$ that causes the first analysis model to learn by using training data in which a correct label is provided to an image.

In this way, the first analysis model can be caused to learn by predominantly using an image of a capturing situation having a high possibility that learning is not sufficient. Therefore, accuracy of a result acquired by analyzing, by using the first analysis model, an image in which a road is captured can be improved.

According to the example embodiment 1, the information processing system 100 further includes the second learning unit 125$b$ that causes the second analysis model to learn by using training data in which a correct label is provided to an image.

In this way, the second analysis model can be caused to learn by predominantly using an image of a capturing situation having a high possibility that learning is not sufficient. Therefore, accuracy of a result acquired by analyzing, by using the second analysis model, an image in which a road is captured can be improved.

According to the example embodiment 1, the second information processing apparatus 104 is an information processing apparatus for collecting a machine learning image, and includes the generation unit 122 and the storage processing unit 123. The generation unit 122 processes an image in which a road is captured, and generates capturing situation information indicating a situation related to capturing of the image. The storage processing unit 123 performs processing for storing an image, based on the capturing situation information.

In this way, for example, an image can be selected by using a capturing situation, and thus a machine learning model can be caused to learn by predominantly using an image of a capturing situation having a high possibility that learning is not sufficient. Therefore, accuracy of a result acquired by analyzing, by using the machine learning model, an image in which a road is captured can be improved.

Modification Example 1

A functional configuration of the generation unit 122 may be changed in various ways. Further, information used for generating capturing situation information by the information generation unit 122$e$ may be changed in various ways according to a functional configuration and the like of the generation unit 122.

For example, the generation unit 122 may include at least one of the first analysis unit 122$a$ and the second analysis unit 122$b$. Further, for example, the generation unit 122 may not include the setting information holding unit 122$c$ and the external information acquisition unit 122$d$. The information generation unit 122$e$ in this case may generate capturing situation information by using at least one of a capturing condition and road information.

Furthermore, the generation unit 122 may further include at least one of the setting information holding unit 122$c$ and the external information acquisition unit 122$d$. The information generation unit 122$e$ in this case may generate capturing situation information by using at least one of a capturing condition and road information, and at least one of setting information and external information.

Furthermore, the information generation unit 122$e$ may generate capturing situation information by further using image information. For example, when image information includes accompanying information, the information generation unit 122$e$ may generate capturing situation information by further using at least one of an image and the accompanying information.

The present modification example 1 can also achieve an effect similar to that in the example embodiment 1.

Modification Example 2

As described in the example embodiment 1, information included in capturing situation information is not limited to a time classification, an irradiation state such as backlight, front light, and oblique light, weather, a capturing ID, a depression angle in a capturing direction, a road state, an event, and a traveling direction. Further, information used for generating capturing situation information and a method for acquiring the information are not limited to the method described in the example embodiment 1, and may be changed in various ways.

For example, the information generation unit 122$e$ may generate capturing situation information by using at least one of image information, a capturing condition, road information, setting information, and external information.

For example, the first analysis unit 122$a$ may acquire weather in a capturing range of the capturing apparatus 101 by processing an image acquired by the image acquisition unit 121. In this case, for example, the first analysis unit 122$a$ may further acquire the weather by using the first analysis model with, as an input, an image (i.e., an image in which a road is captured) acquired in step S121.

For example, the information generation unit 122$e$ may acquire an irradiation state such as the morning sun and the evening sun, based on a capturing time and weather included in image accompanying information.

For example, image accompanying information includes exposure information, and the information generation unit 122$e$ may acquire the exposure information, based on the image accompanying information.

For example, the information generation unit 122$e$ may acquire brightness information about an image by processing an image acquired by the image acquisition unit 121. The processing may be, for example, statistical processing, or may be processing using the first analysis model.

For example, the information generation unit 122$e$ may acquire a latitude and a longitude indicating a capturing range, based on a capturing place included in image accompanying information and a capturing direction and an angle of view included in setting information.

For example, the first analysis unit 122$a$ may acquire a depression angle of the capturing apparatus 101 in a capturing direction by processing an image acquired by the image acquisition unit 121. In this case, for example, the first analysis unit 122$a$ may further acquire the depression angle by using the first analysis model with, as an input, an image (i.e., an image in which a road is captured) acquired in step S121.

For example, image accompanying information or setting information may include a part or the whole of a name of a preset road, information for identifying a section of a road, and information for identifying a lane of a road. The information generation unit 122$e$ may acquire a name of a road, information for identifying a section of a road, and information for identifying a lane of a road, based on the image accompanying information or the setting information.

The present modification example can also achieve an effect similar to that in the example embodiment 1.

Example Embodiment 2

In the example embodiment 1, the example in which, when a machine learning model is caused to learn, a machine learning image is selected from learning information stored in the recording apparatus 103, based on a capturing situation, is described. However, when all images are stored in the recording apparatus 103, there is a risk that a data amount becomes enormous. In an example embodiment 2, an example in which an image selected based on a capturing situation is stored in a recording apparatus 103 will be described.

In the present example embodiment, description of a configuration similar to that in the example embodiment 1 will be appropriately omitted for simplifying the description. (Configuration Example of Information Processing System According to Example Embodiment 2)

An information processing system according to the example embodiment 2 functionally includes a first information processing apparatus 202 instead of the first information processing apparatus 102 according to the example embodiment 1. The information processing system may be configured similarly to the information processing system 100 according to the example embodiment 1 except for the first information processing apparatus 202.

Figure 22:
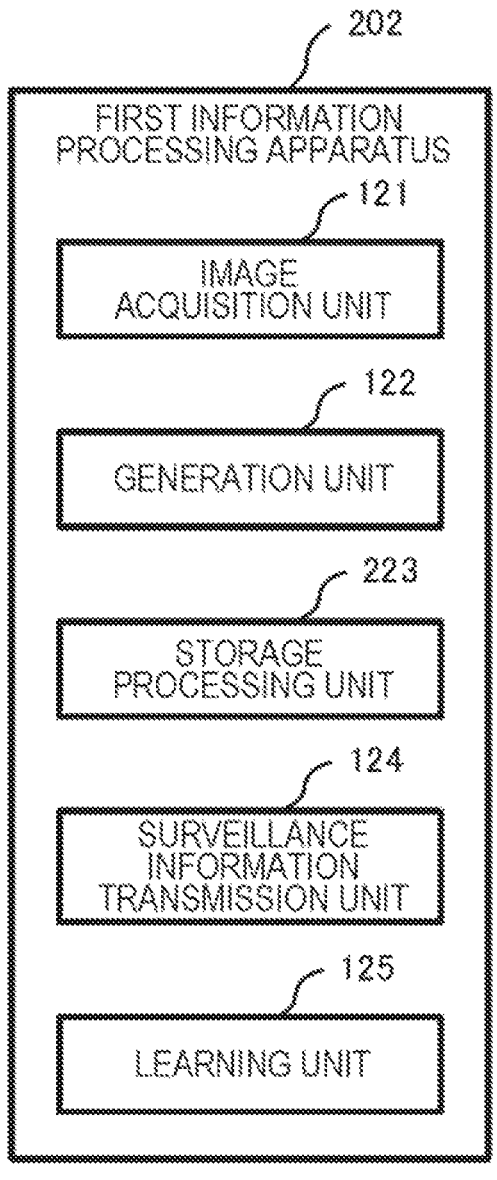
FIG. 22 is a diagram illustrating a functional configuration example of a first information processing apparatus according to an example embodiment 2.

FIG. 22 is a diagram illustrating a functional configuration example of the first information processing apparatus 202 according to the example embodiment 2. The first information processing apparatus 202 includes a storage processing unit 223 instead of the storage processing unit 123 according to the example embodiment 1. The first information processing apparatus 202 may be configured similarly to the first information processing apparatus 102 according to the example embodiment 1 except for the storage processing unit 223.

The storage processing unit 223 performs processing for storing an image, based on capturing situation information similarly to the storage processing unit 123 according to the example embodiment 1.

When the storage processing unit 223 according to the present example embodiment decides that an image is to be stored, based on capturing situation information and a storage condition, the storage processing unit 123 stores the image in the recording apparatus 103.

A storage condition is a condition for deciding an image to be a storage target.

A storage condition according to the present example embodiment is set by, for example, a user. For example, similarly to a selection condition according to the example embodiment 1, a user may specify, as a storage condition, a capturing situation having a high possibility that learning of a machine learning model caused to learn such as a first analysis model and a second analysis model is not sufficient.

For example, a storage condition may be set for each item included in capturing situation information, and includes a condition related to at least one of a capturing timing, a capturing condition, apparatus information about a capturing apparatus that captures the image, and road information about a road captured in the image.

Figure 23:
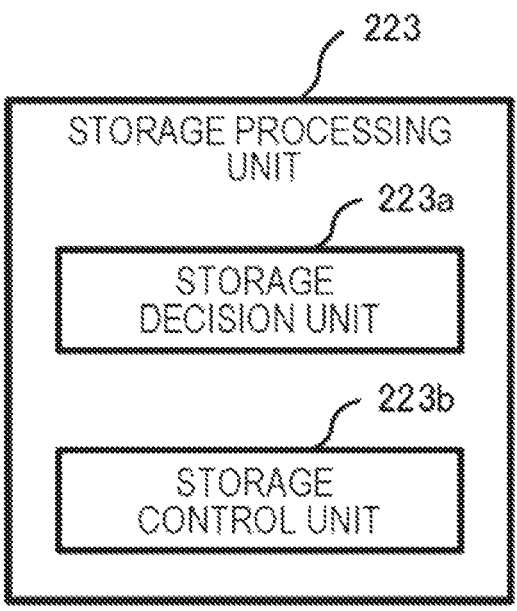
FIG. 23 is a diagram illustrating a functional configuration example of a storage processing unit according to the example embodiment 2.

FIG. 23 is a diagram illustrating a functional configuration example of the storage processing unit 223 according to the example embodiment 2. The storage processing unit 223 includes a storage decision unit 223a and a storage control unit 223b.

The storage decision unit 223a decides whether to store an image, based on capturing situation information and a storage condition.

When it is decided that an image is stored, the storage control unit 223b stores the image in the recording apparatus 103.

The functional configuration example of the information processing system according to the example embodiment 2 is mainly described above. The information processing system according to the present example embodiment may be physically configured similarly to the information processing system 100 according to the example embodiment 1. Hereinafter, an operation example of the information processing system according to the example embodiment 2 will be described.

(Operation Example of Information Processing System According to Example Embodiment 2)

The information processing system according to the example embodiment 2 performs information processing for collecting a machine learning image similarly to the information processing system 100 according to the example embodiment 1. The information processing according to the present example embodiment includes capturing processing, recording processing, and second information processing similar to those in the example embodiment 1. Further, the information processing according to the present example embodiment includes first information processing different from that in the example embodiment 1.

(Example of First Information Processing According to Example Embodiment 2)

Figure 24:
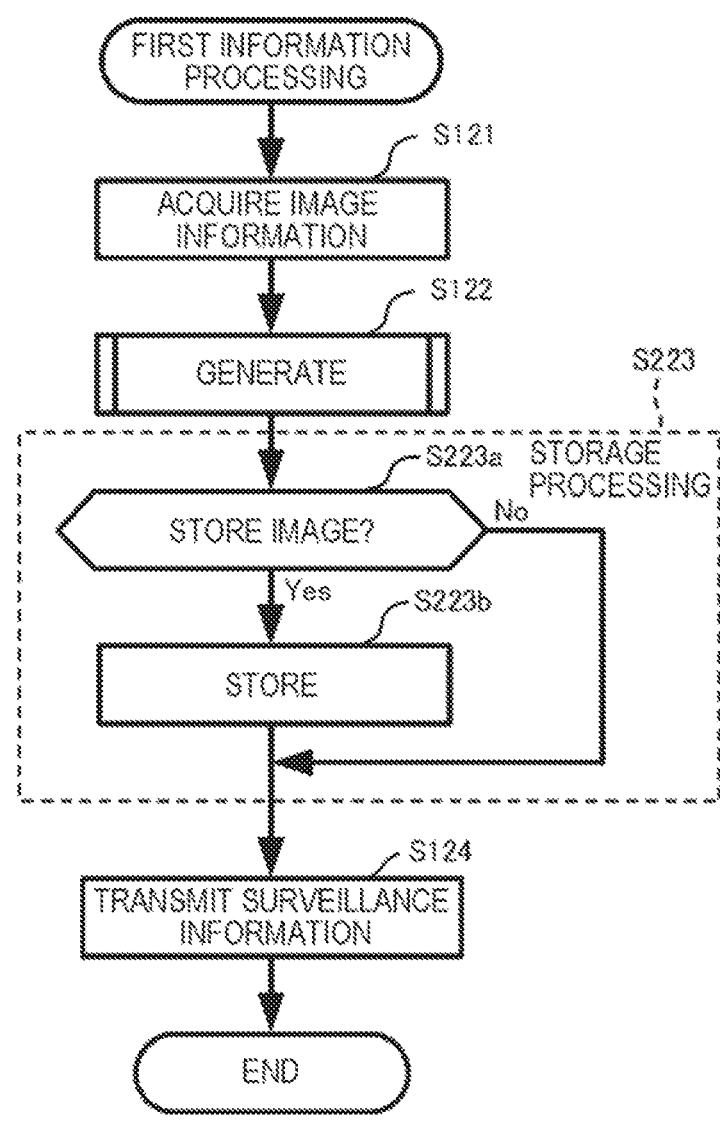
FIG. 24 is a flowchart illustrating one example of first information processing according to the example embodiment 2.

FIG. 24 is a flowchart illustrating one example of the first information processing according to the example embodiment 2. The first information processing according to the present example embodiment includes storage processing (step S223) instead of the storage processing (step S123) according to the example embodiment 1.

Subsequent to step S122, the storage processing unit 223 performs processing for storing an image, based on capturing situation information generated in step S122e, similarly to step S123 according to the example embodiment 1 (step S223). Details of the storage processing (step S223) are different from the storage processing (step S123) according to the example embodiment 1.

The storage decision unit 223a decides whether to store an image, based on the capturing situation information generated in step S122e and a storage condition (step S223a).

Specifically, for example, when the capturing situation information generated in step S122e satisfies the storage condition, the storage decision unit 223a decides that an image acquired in step S121 is stored. When the capturing situation information generated in step S122e does not satisfy the storage condition, the storage decision unit 223a decides that the image acquired in step S121 is not stored.

When it is decided that the image is not to be stored (step S223a; No), step S124 similar to that in the example embodiment 1 is performed. In this way, an image associated with a capturing situation that does not satisfy the storage condition is not stored in the recording apparatus 103.

When it is decided that an image is to be stored (step S223a; Yes), the storage control unit 223b stores the image acquired in step S121 in the recording apparatus 103 (step S223b), and step S124 similar to that in the example embodiment 1 is subsequently performed.

Specifically, for example, the storage control unit 223b generates learning information by associating the image acquired in step S121 with the capturing situation information generated in step S122e. The storage control unit 223b transmits the generated learning information to the recording apparatus 103. In this way, the storage control unit 223b stores the learning information in the recording apparatus 103.

By performing such first information processing, an image associated with a capturing situation that satisfies the storage condition can be stored in the recording apparatus 103.

Thus, step S151 may not be performed in learning processing. In this case, in step S152, a second learning unit 125*b* may create training data by acquiring learning information from the recording apparatus 103 and providing a correct label to an image (machine learning image) included in the acquired learning information according to an input of a user.

Note that, also in the present example embodiment, capturing situation information is associated with an image, and thus step S151 may be performed similarly to the example embodiment 1. In this way, the second analysis model can be caused to learn by using an image (machine learning image) further narrowed down from images associated with a capturing situation that satisfies a storage condition.

(Action and Effect)

According to the example embodiment 2, the storage processing unit 223 includes the storage decision unit 223*a* and the storage control unit 223*b*. The storage decision unit 223*a* decides whether to store an image, based on capturing situation information and a storage condition. When it is decided that an image is stored, the storage control unit 223*b* stores the image in the recording apparatus 103 for storing a machine learning image.

In this way, an image associated with a capturing situation that satisfies a storage condition can be stored in the recording apparatus 103. Therefore, a data amount stored in the recording apparatus 103 can be further reduced than when an image is stored in the recording apparatus 103 regardless of whether a storage condition is satisfied.

Example Embodiment 3

In the example embodiment 2, an example in which an image associated with a capturing situation that satisfies a storage condition is stored in the recording apparatus 103 without particularly imposing a limit is described. However, even in a case of an image associated with a capturing situation that satisfies a storage condition, when an image having a data amount to some extent is stored, there is a high possibility that it is not sufficient for learning of a machine learning model. In an example embodiment 3, an example in which an image to be stored in a recording apparatus 103 is limited by a data amount will be described.

In the present example embodiment, description of a configuration similar to that in the other example embodiments will be appropriately omitted for simplifying the description.

(Configuration Example of Information Processing System According to Example Embodiment 3)

An information processing system according to the example embodiment 3 functionally includes a first information processing apparatus 302 instead of the first information processing apparatus 102 according to the example embodiment 1. The information processing system may be configured similarly to the information processing system 100 according to the example embodiment 1 except for the first information processing apparatus 302.

Figure 25:
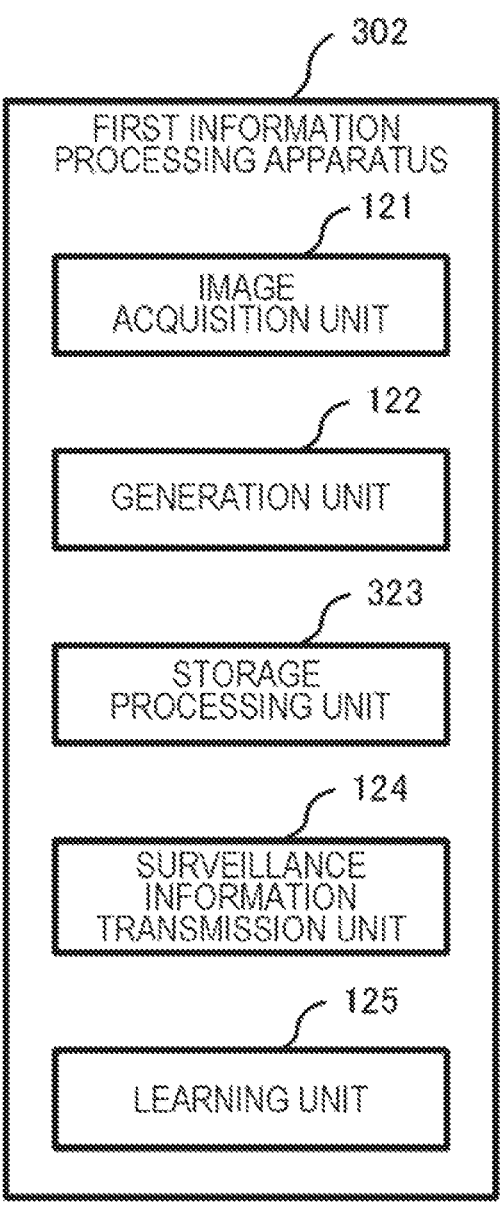
FIG. 25 is a diagram illustrating a functional configuration example of a first information processing apparatus according to an example embodiment 3.

FIG. 25 is a diagram illustrating a functional configuration example of the first information processing apparatus 302 according to the example embodiment 3. The first information processing apparatus 302 includes a storage processing unit 323 instead of the storage processing unit

123 according to the example embodiment 1. The first information processing apparatus 302 may be configured similarly to the first information processing apparatus 102 according to the example embodiment 1 except for the storage processing unit 323.

The storage processing unit 323 performs processing for storing an image, based on capturing situation information, similarly to the storage processing unit 123 according to the example embodiment 1. Further, similarly to the storage processing unit 223 according to the example embodiment 2, when the storage processing unit 323 decides that an image is to be stored, based on capturing situation information and a storage condition, the storage processing unit 323 stores the image in the recording apparatus 103.

Figure 26:
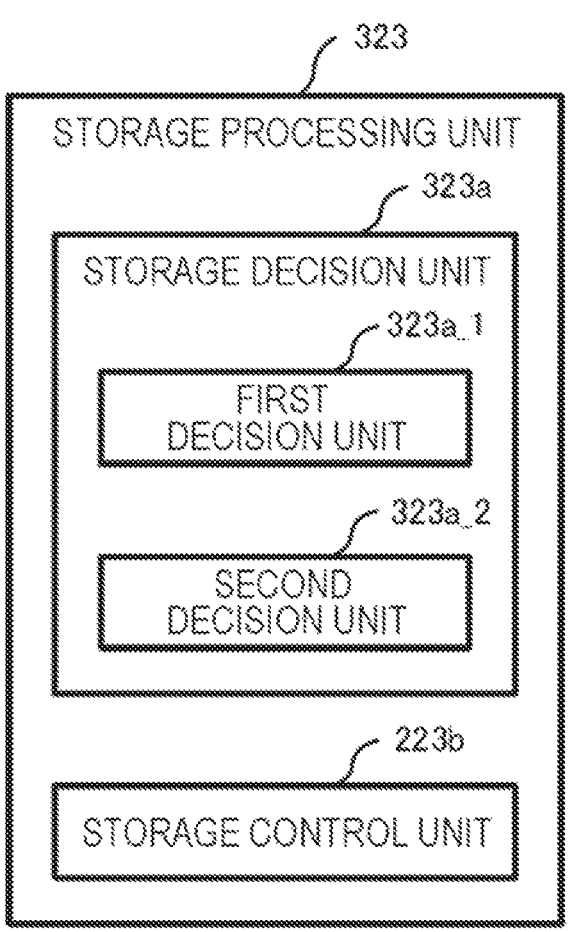
FIG. 26 is a diagram illustrating a functional configuration example of a storage processing unit according to the example embodiment 3.

FIG. 26 is a diagram illustrating a functional configuration example of the storage processing unit 323 according to the example embodiment 3. The storage processing unit 323 includes a storage decision unit 323*a* instead of the storage decision unit 223*a* according to the example embodiment 2, and a storage control unit 223*b* similar to that in the example embodiment 2.

The storage decision unit 323*a* decides whether to store an image, based on capturing situation information and a storage condition, similarly to the storage decision unit 223*a* according to the example embodiment 2.

A storage condition according to the present example embodiment is different from a storage condition according to the example embodiment 2, and includes a condition associated with a target capturing condition and an image amount condition.

The target capturing condition determines a capturing condition that needs to be satisfied by an image to be a storage target. The target capturing condition may be similar to a storage condition according to the example embodiment 2. In other words, for example, the target capturing condition may be set for each item included in a capturing situation, and includes a condition related to at least one of a capturing timing, a capturing condition, apparatus information about a capturing apparatus that captures the image, and road information about a road captured in the image.

The image amount condition is a condition related to a data amount of an image. The image amount condition is defined by using at least one of the number of the images, a time of a video formed of the image, and a data amount of the image. The image amount condition may include a condition related to a period, and, in this case, for example, may be a condition related to a data amount of an image stored for a predetermined period (for example, within one year).

Also in the present example embodiment, such a storage condition may be set by, for example, a user.

The storage decision unit 323*a* according to the present example embodiment decides whether to store an image, based on the capturing situation information, the target capturing condition, and the image amount condition.

As illustrated in FIG. 26, the storage decision unit 323*a* includes a first decision unit 323*a*_1 and a second decision unit 323*a*_2.

The first decision unit 323*a*_1 decides whether capturing situation information generated for an image satisfies a target capturing condition.

When it is decided that the target capturing condition is satisfied, the second decision unit 323*a*_2 decides whether to store an image, based on a data amount of a machine learning image that satisfies the target capturing condition, and an image amount condition. Herein, the machine learning image that satisfies the target capturing condition is an image that satisfies the target capturing condition among images stored in the recording apparatus 103.

The functional configuration example of the information processing system according to the example embodiment 3 is mainly described above. The information processing system according to the present example embodiment may be physically configured similarly to the information processing system 100 according to the example embodiment 1. Hereinafter, an operation example of the information processing system according to the example embodiment 3 will be described.

(Operation Example of Information Processing System According to Example Embodiment 3)

The information processing system according to the example embodiment 3 performs information processing for collecting a machine learning image similarly to the information processing system 100 according to the example embodiment 1. The information processing according to the present example embodiment includes capturing processing, recording processing, and second information processing similar to those in the example embodiment 1. Further, the information processing according to the present example embodiment includes first information processing different from that in the example embodiment 1.

(Example of First Information Processing According to Example Embodiment 3)

Figure 27:
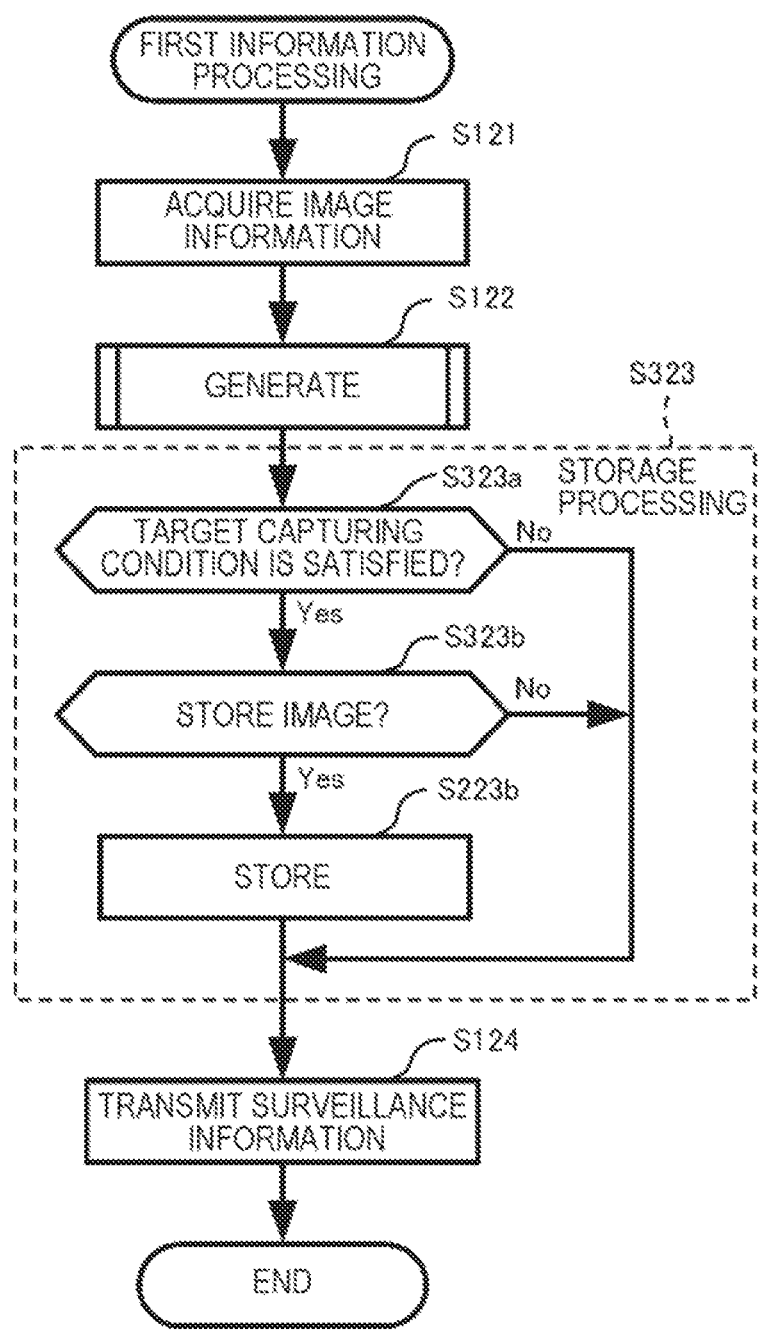
FIG. 27 is a flowchart illustrating one example of first information processing according to the example embodiment 3.

FIG. 27 is a flowchart illustrating one example of the first information processing according to the example embodiment 3. The first information processing according to the present example embodiment includes storage processing (step S323) instead of the storage processing (step S123) according to the example embodiment 1.

Subsequent to step S122, the storage processing unit 323 performs processing for storing an image, based on the capturing situation information generated in step S122e, similarly to step S123 according to the example embodiment 1 (step S323). Details of the storage processing (step S323) are different from the storage processing (step S123) according to the example embodiment 1.

The first decision unit 323a_1 decides whether the capturing situation information generated in step S122e satisfies a target capturing condition (step S323a).

When it is decided that the target capturing condition is not satisfied (step S323a; No), the first decision unit 323a_1 ends the first information processing. In this way, an image associated with a capturing situation that does not satisfy the target capturing condition is not stored.

When it is decided that the target capturing condition is satisfied (step S323a; Yes), the second decision unit 323a_2 decides whether to store an image (step S323b).

Specifically, for example, when a data amount of a machine learning image that satisfies the target capturing condition is equal to or less than an image amount condition associated with the target capturing condition, the second decision unit 323a_2 decides that the image acquired in step S121 is to be stored. Further, when a data amount of a machine learning image that satisfies the target capturing condition is more than the image amount condition associated with the target capturing condition, the second decision unit 323a_2 decides that the image acquired in step S121 is not to be stored.

When it is decided that the image is not to be stored (step S323b; No), step S124 similar to that in the example embodiment 1 is performed. In this way, when a data amount of a machine learning image that satisfies the target capturing condition exceeds a predetermined amount defined in the image amount condition, even an image that satisfies the target capturing condition is not stored in the recording apparatus 103.

When it is decided that the image is to be stored (step S323b; Yes), step S223b similar to that in the example embodiment 2 is performed, and step S124 similar to that in the example embodiment 1 is subsequently performed.

By performing such first information processing, an image associated with a capturing situation that satisfies a target capturing condition can be stored in the recording apparatus 103 until a predetermined amount defined in an image amount condition is reached. Further, an image associated with a capturing situation that satisfies a target capturing condition is not stored while exceeding a predetermined amount defined in an image amount condition.

(Action and Effect)

According to the example embodiment 3, a storage condition includes a condition in which a target capturing condition determining a capturing condition that needs to be satisfied by an image to be a storage target is associated with an image amount condition related to a data amount of the image.

The storage decision unit 323a includes the first decision unit 323a_1 and the second decision unit 323a_2. The first decision unit 323a_1 decides whether capturing situation information generated for an image satisfies a target capturing condition. When it is decided that the target capturing condition is satisfied, the second decision unit 323a_2 decides whether to store an image, based on a data amount of a machine learning image that satisfies the target capturing condition, and an image amount condition.

In this way, an image associated with a capturing situation that satisfies the target capturing condition can be stored in the recording apparatus 103 until a predetermined amount defined in the image amount condition is reached. Thus, an image of a capturing situation having a high possibility that learning is not sufficient can be stored, and a machine learning model can be caused to learn by using the image. Therefore, accuracy of a result acquired by analyzing, by using the machine learning model, an image in which a road is captured can be improved.

Further, it can be suppressed that an image associated with a capturing situation that satisfies a target capturing condition is stored while exceeding a predetermined amount defined in an image amount condition. Therefore, an increase in a data amount stored in the recording apparatus 103 can be suppressed.

According to the example embodiment 3, an image amount condition is defined by using at least one of the number of images, a time of a video formed of an image, and a data amount of an image.

In this way, the image amount condition can be appropriately set. Therefore, as described above, accuracy of a result acquired by analyzing, by using a machine learning model, an image in which a road is captured can be improved. Further, an increase in a data amount stored in the recording apparatus 103 can be suppressed.

According to the example embodiment 3, a target capturing condition includes a condition related to at least one of a capturing timing, a capturing condition, apparatus information about a capturing apparatus that captures an image, and road information about a road captured in an image.

In this way, the target capturing condition can be appropriately set for an item similar to capturing situation information, and a machine learning model can be caused to learn by predominantly using an image of a capturing situation having a high possibility that learning is not sufficient. Therefore, accuracy of a result acquired by analyzing, by using the machine learning model, an image in which a road is captured can be improved.

Modification Example 3

Each of the example embodiments is described by using the example in which the information processing system includes one first information processing apparatus 102. However, the information processing system may include a plurality of the first information processing apparatuses 102.

Figure 28:
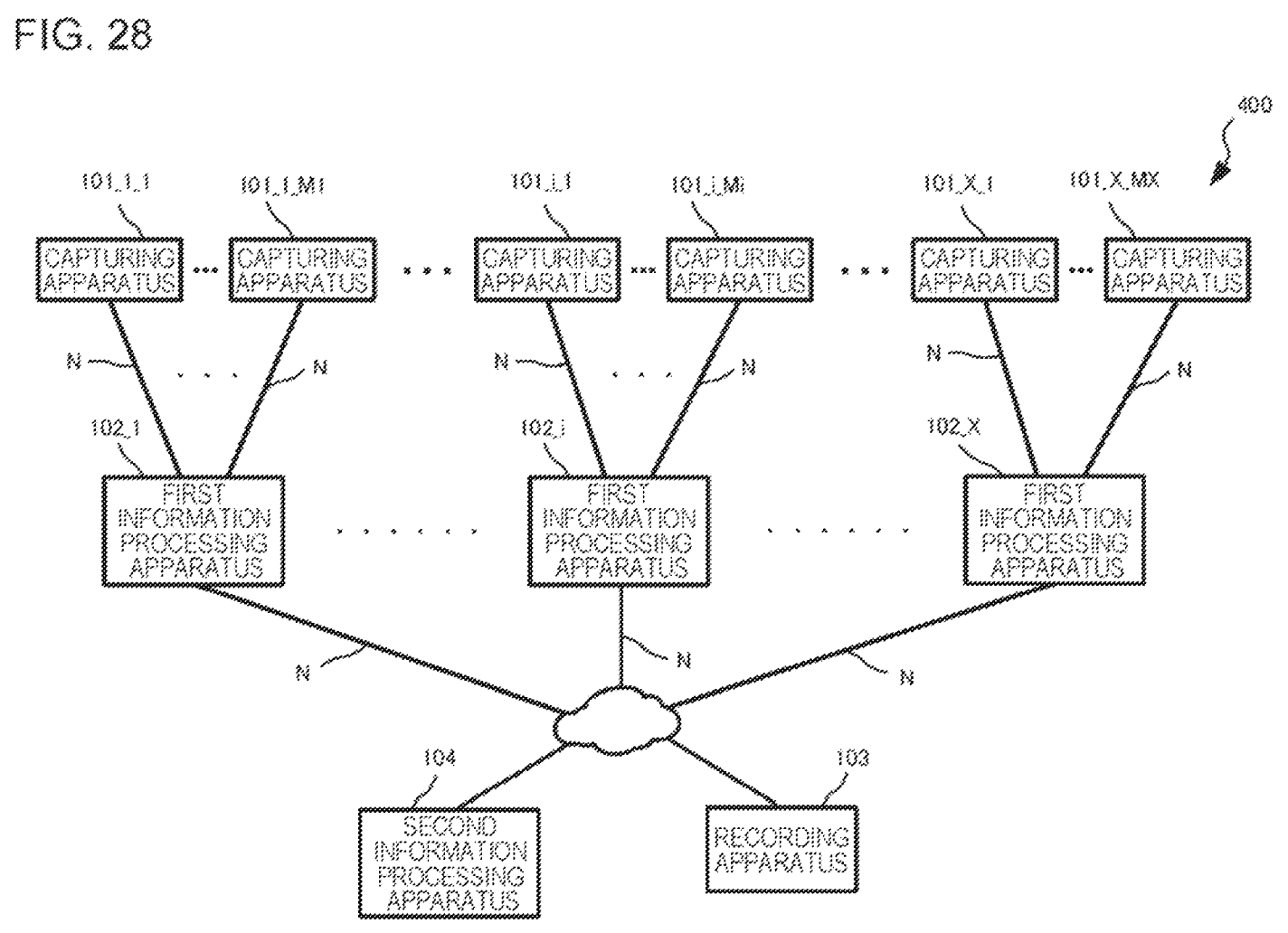

FIG. 28 is a diagram illustrating a configuration example of an information processing system according to a modification example 3. The information processing system according to the present modification example includes a plurality of capturing apparatuses 101_1_1 to 101_1_M1 and 101_X_1 to 101_X_MX, one or a plurality of first information processing apparatuses 102_1 to 102_X, the recording apparatus 103, and the second information processing apparatus 104. Each of M1 and MX is an integer equal to or more than one. X is an integer equal to or more than two.

Each of the capturing apparatuses 101_*i*_1 to 101_*i*_Mi (i is an integer, 1≤i≤X, and Mi is an integer equal to or more than one) and the first information processing apparatus 102_*i* may be connected to each other via the network N similar to that in the example embodiment 1. Further, the first information processing apparatus 102_*i* may be connected to each of the recording apparatus 103 and the second information processing apparatus 104 via the network N. Note that, the present invention is not limited to this, and any apparatuses constituting the information processing system may be connected to each other via the network N.

The first information processing apparatus 102_*i* corresponds to the first information processing apparatuses 102, 202, and 302 according to the example embodiment 1. The capturing apparatuses 101_*i*_1 to 101_*i*_Mi connected to the first information processing apparatus 102_*i* correspond to the capturing apparatuses 101_1 to 101_M according to the example embodiment 1.

The present modification example can be applied to each of the example embodiments and the like, and can achieve an effect similar to that in each of the applied example embodiments and the like.

While the example embodiments and the modification examples of the present invention have been described with reference to the drawings, the example embodiments and the modification examples are only exemplification of the present invention, and various configurations other than the above-described example embodiments and modification examples can also be employed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, the example embodiments and the modification examples described above can be combined within an extent that a content is not inconsistent.

A part or the whole of the above-described example embodiments may also be described in supplementary notes below, which is not limited thereto.

1. An information processing system for collecting a machine learning image, the information processing system including:
   a generation means for processing an image in which a road is captured, and generating capturing situation information indicating a situation related to capturing of the image; and
   a storage processing means for performing processing for storing the image, based on the capturing situation information.

2. The information processing system according to supplementary note 1, wherein
   the capturing situation information includes at least one of a capturing timing, a capturing condition, apparatus information about a capturing apparatus that captures the image, and road information about a road captured in the image.

3. The information processing system according to supplementary note 2, wherein
   the capturing condition includes at least one of an irradiation state, weather, exposure information, and brightness information about the image,
   the apparatus information includes at least one of a capturing range, information for identifying the capturing apparatus, and a depression angle of the capturing apparatus in a capturing direction, and
   the road information includes at least one of a road state indicating a state of the road, an event that occurs on the road, and road unique information being predetermined information about the road.

4. The information processing system according to any one of supplementary notes 1 to 3, wherein
   the generation means includes
      at least one of a first analysis means for acquiring a capturing condition by using a first analysis model that has learned, with the image as an input, in order to process an image in which a road is captured and acquire the capturing condition, and a second analysis means for acquiring road information by using a second analysis model that has learned, with the image as an input, in order to process an image in which a road is captured and acquire the road information, and
      an information generation means for generating the capturing situation information by using at least one of the capturing condition and the road information.

5. The information processing system according to supplementary note 4, further including
   an image acquisition means for acquiring image information including the image from a capturing apparatus, wherein
   the generation means further includes at least one of
      a setting information holding means for holding setting information set for processing the image, and
      an external information acquisition means for acquiring external information from an external apparatus, and
   the information generation means generates the capturing situation information by using at least one of the capturing condition and the road information, the image information, and at least one of the setting information and the external information.

6. The information processing system according to supplementary note 4 or 5, wherein
the first analysis model and the second analysis model are formed by using neural networks independent of each other.

7. The information processing system according to any one of supplementary notes 4 to 6, wherein
the storage processing means stores, in a learning information storage means, learning information in which the image is associated with at least a part of the capturing situation information.

8. The information processing system according to any one of supplementary notes 1 to 7, wherein
the storage processing means includes
a storage decision means for deciding whether to store the image, based on the capturing situation information and a storage condition, and
a storage control means for storing the image in a learning information storage means for storing the machine learning image when it is decided that the image is to be stored.

9. The information processing system according to supplementary note 8, wherein
the storage condition includes a condition in which a target capturing condition determining a capturing condition that needs to be satisfied by an image to be a storage target is associated with an image amount condition related to a data amount of an image, and
the storage decision means includes
a first decision means for deciding whether the capturing situation information generated for the image satisfies the target capturing condition, and
a second decision means for deciding whether to store the image, based on a data amount of the machine learning image that satisfies the target capturing condition, and the image amount condition, when it is decided that the target capturing condition is satisfied.

10. The information processing system according to supplementary note 9, wherein
the image amount condition is defined by using at least one of the number of the images, a time of a video formed of the image, and a data amount of the image.

11. The information processing system according to supplementary note 9 or 10, wherein
the target capturing condition includes a condition related to at least one of a capturing timing, a capturing condition, apparatus information about a capturing apparatus that captures the image, and road information about a road captured in the image.

12. The information processing system according to any one of supplementary notes 4 to 11, further including
a first learning means for causing the first analysis model to learn by using training data in which a correct label is provided to the image.

13. The information processing system according to any one of supplementary notes 5 to 12, further including
a second learning means for causing the second analysis model to learn by using training data in which a correct label is provided to the image.

14. An information processing apparatus for collecting a machine learning image, the information processing apparatus including:
a generation means for processing an image in which a road is captured, and generating capturing situation information about a situation related to capturing of the image; and a storage processing means for performing processing for storing the image, based on the capturing situation information.

15. An information processing method for collecting a machine learning image by one or more computers, the information processing method including,
by the one or more computers:
processing an image in which a road is captured, and generating capturing situation information about a situation related to capturing of the image; and
performing processing for storing the image, based on the capturing situation information.

16. A program for causing one or more computers to collect a machine learning image, the program for causing the one or more computers to execute:
processing an image in which a road is captured, and generating capturing situation information about a situation related to capturing of the image; and
performing processing for storing the image, based on the capturing situation information.

17. A storage medium storing a program for causing one or more computers to collect a machine learning image, the program for causing the one or more computers to execute:
processing an image in which a road is captured, and generating capturing situation information about a situation related to capturing of the image; and
performing processing for storing the image, based on the capturing situation information.

What is claimed is:
1. An information processing system for collecting a machine learning image, the information processing system comprising:
a memory configured to store instructions; and
a processor configured to execute the instructions to execute:
processing an image in which a road is captured, and generating capturing situation information indicating a situation related to capturing of the image;
deciding whether to store the image, based on the capturing situation information and a storage condition; and
storing the image in learning information storage for machine learning when it is decided that the image is to be stored, wherein,
the capturing situation information includes a capturing condition and road information about the road captured in the image,
a first analysis model is trained, using the image stored in the learning information storage as an input, to process a captured image of a road and acquire the capturing condition,
a second analysis model is trained, using the image stored in the learning information storage as an input, to process a captured image of a road and acquire the road information, and
processing the image and generating capturing situation information includes
acquiring a capturing condition by using the first analysis model that has been trained to process a captured image of a road and acquire the capturing condition, and
acquiring road information by using the second analysis model that has been trained to process a captured image of a road and acquire the road information.

2. The information processing system according to claim 1, wherein the capturing situation information further includes at least one of a capturing timing, and apparatus information about a capturing apparatus that captures the image.

3. The information processing system according to claim 2, wherein the capturing condition includes at least one of an irradiation state, weather, exposure information, and brightness information about the image, the apparatus information includes at least one of a capturing range, information for identifying the capturing apparatus, and a depression angle of the capturing apparatus in a capturing direction, and the road information includes at least one of a road state indicating a state of the road, an event that occurs on the road, and road unique information being predetermined information about the road.

4. The information processing system according to claim 1, further comprising acquiring image information including the image from a capturing apparatus, wherein processing the image and generating capturing situation information further includes at least one of holding setting information set for processing the image, and acquiring external information from an external apparatus, and in generating the capturing situation information, generating the capturing situation information by using at least one of the capturing condition and the road information, the image information, and at least one of the setting information and the external information.

5. The information processing system according to claim 1, wherein the storage condition includes a target capturing condition, which determines a capturing condition that needs to be satisfied by an image to be a storage target, and an image amount condition, which is related to a data amount of an image, and deciding whether to store the image includes deciding whether the capturing situation information generated for the image satisfies the target capturing condition, and deciding whether to store the image, based on a data amount of the machine learning image that satisfies the target capturing condition, and the image amount condition, when it is decided that the target capturing condition is satisfied.

6. An information processing method for collecting a machine learning image by one or more computers, the information processing method comprising, by the one or more computers:

processing an image in which a road is captured, and generating capturing situation information about a situation related to capturing of the image;

deciding whether to store the image, based on the capturing situation information and a storage condition, and performing processing for storing the image in learning information storage for machine learning when it is decided that the image is to be stored, wherein the capturing situation information includes a capturing condition and road information about the road captured in the image, a first analysis model is trained, using the image stored in the learning information storage as an input, to process a captured image of a road and acquire the capturing condition, a second analysis model is trained, using the image stored in the learning information storage as an input, to process a captured image of a road and acquire the road information, and processing the image and generating capturing situation information includes acquiring a capturing condition by using the first analysis model that has been trained to process a captured image of a road and acquire the capturing condition, and acquiring road information by using the second analysis model that has been trained to process a captured image of a road and acquire the road information.

7. The information processing method according to claim 6, wherein the capturing situation information further includes at least one of a capturing timing, and apparatus information about a capturing apparatus that captures the image.

8. The information processing method according to claim 7, wherein the capturing condition includes at least one of an irradiation state, weather, exposure information, and brightness information about the image, the apparatus information includes at least one of a capturing range, information for identifying the capturing apparatus, and a depression angle of the capturing apparatus in a capturing direction, and the road information includes at least one of a road state indicating a state of the road, an event that occurs on the road, and road unique information being predetermined information about the road.

9. The information processing method according to claim 6, further comprising acquiring image information including the image from a capturing apparatus, wherein processing the image and generating capturing situation information further includes at least one of holding setting information set for processing the image, and acquiring external information from an external apparatus, and in generating the capturing situation information, generating the capturing situation information by using at least one of the capturing condition and the road information, the image information, and at least one of the setting information and the external information.

10. The information processing method according to claim 6, wherein the storage condition includes a target capturing condition, which determines a capturing condition that needs to be satisfied by an image to be a storage target, and an image amount condition, which is related to a data amount of an image, and deciding whether to store the image includes deciding whether the capturing situation information generated for the image satisfies the target capturing condition, and deciding whether to store the image, based on a data amount of the machine learning image that satisfies the target capturing condition, and the image amount condition, when it is decided that the target capturing condition is satisfied.

11. A non-transitory storage medium storing a program for causing one or more computers to collect a machine learning image, the program for causing the one or more computers to execute:

processing an image in which a road is captured, and generating capturing situation information about a situation related to capturing of the image;

deciding whether to store the image, based on the capturing situation information and a storage condition; and storing the image in learning information storage for storing the machine learning image when it is decided that the image is to be stored, wherein the capturing situation information includes a capturing condition and road information about the road captured in the image, a first analysis model is trained, using the image stored in the learning information storage as an input, to process a captured image of a road and acquire the capturing condition, a second analysis model is trained, using the image stored in the learning information storage as an input, to process a captured image of a road and acquire the road information, and processing the image and generating capturing situation information includes acquiring a capturing condition by using the first analysis model that has been trained to process a captured image of a road and acquire the capturing condition, and acquiring road information by using the second analysis model that has been trained to process a captured image of a road and acquire the road information.

12. The non-transitory storage medium storing the program according to claim 11, wherein the capturing situation information further includes at least one of a capturing timing, and apparatus information about a capturing apparatus that captures the image.

13. The non-transitory storage medium storing the program according to claim 12, wherein the capturing condition includes at least one of an irradiation state, weather, exposure information, and brightness information about the image, the apparatus information includes at least one of a capturing range, information for identifying the capturing apparatus, and a depression angle of the capturing apparatus in a capturing direction, and the road information includes at least one of a road state indicating a state of the road, an event that occurs on the road, and road unique information being predetermined information about the road.

14. The non-transitory storage medium storing the program according to claim 11, further comprising acquiring image information including the image from a capturing apparatus, wherein processing the image and generating capturing situation information further includes at least one of holding setting information set for processing the image, and acquiring external information from an external apparatus, and in generating the capturing situation information, generating the capturing situation information by using at least one of the capturing condition and the road information, the image information, and at least one of the setting information and the external information.

15. The information processing system according to claim 1, wherein the first analysis model and the second analysis model are formed by using neural networks independent of each other.

16. The information processing system according to claim 5, wherein the image amount condition is defined by using at least one of a number of images, a time of a video formed of the image, and a data amount of the image.

17. The information processing system according to claim 16, wherein the target capturing condition includes a condition related to at least one of a capturing timing, a capturing condition, apparatus information about a capturing apparatus that captures the image, and road information about a road captured in the image.

18. The information processing system according to claim 1, wherein the processor is further configured to execute the instructions to execute:

training the first analysis model, using the image stored in the learning information storage as an input, to process a captured image of a road and acquire the capturing condition, and training the second analysis model, using the image stored in the learning information storage as an input, to process a captured image of a road and acquire the road information.

19. The information processing system according to claim 18, wherein the image is decided to be stored when the capturing situation information satisfies the storage condition, and the storing the image includes storing the image in the learning information storage when the capturing situation information satisfies the storage condition.

\* \* \* \* \*